(12) United States Patent
Hart et al.

(10) Patent No.: US 12,257,577 B2
(45) Date of Patent: Mar. 25, 2025

(54) FLUIDIC AUTOSAMPLER AND INCUBATOR

(71) Applicant: Lumacyte, Inc., Charlottesville, VA (US)

(72) Inventors: Sean Hart, Keswick, VA (US); Colin Hebert, Charlottesville, VA (US); Margaret McCoy, Charlottesville, VA (US); Shweta Krishnan, Malden, MA (US); Christopher Field, Arlington, VA (US); Zachary Evans, Charlottesville, VA (US); Adam Lubrano, Waynesboro, VA (US); Nathan LaPuma, Palmyra, VA (US)

(73) Assignee: Lumacyte, Inc., Charlottesville, VA (US)

( * ) Notice: Subject to any disclaimer, the term of this patent is extended or adjusted under 35 U.S.C. 154(b) by 515 days.

(21) Appl. No.: 17/470,639

(22) Filed: Sep. 9, 2021

(65) Prior Publication Data

US 2022/0072541 A1     Mar. 10, 2022

Related U.S. Application Data

(63) Continuation of application No. 16/378,067, filed on Apr. 8, 2019, now abandoned.

(Continued)

(51) Int. Cl.
    *B01L 3/00*         (2006.01)
(52) U.S. Cl.
    CPC ..... *B01L 3/502715* (2013.01); *B01L 3/50273* (2013.01); *B01L 3/502784* (2013.01)
(58) Field of Classification Search
    CPC .......... B01L 3/502715; B01L 3/50273; B01L 3/502784; G01N 2035/00346;

(Continued)

(56) References Cited

U.S. PATENT DOCUMENTS

| 5,620,894 A | 4/1997 | Barger et al. |
| 2004/0048392 A1 | 3/2004 | Kidd |

(Continued)

FOREIGN PATENT DOCUMENTS

| CN | 103119451 A | 5/2013 |
| JP | 2001-123068 A | 5/2001 |

(Continued)

OTHER PUBLICATIONS

The Extended European Search Report dated Nov. 24, 2021, of counterpart European Application No. 19781587.1.

(Continued)

*Primary Examiner* — Jennifer Wecker
(74) *Attorney, Agent, or Firm* — Offit Kurman; Christopher Halliday

(57) ABSTRACT

Provided are devices for automated analysis of one or more samples in single or multi-well plates or vessels, wherein the process of automated analysis comprises automated flow, wherein the samples comprise liquid or particles in a sample vessel, and wherein the devices comprise an assembly of components that enable processing of a sample for analytical assessment by fluidic and/or particle based instruments. Automated flow may comprise systems for moving samples including vacuum systems, pressure-based systems, pneumatic systems, pumps, peristaltic pumps, diaphragms, or syringes. The devices may comprise an assembly of components that enable movement in X, Y, and Z dimensions, as well as switches, microfluidic tubing, well plate block, electronic pressure controllers, pneumatic or fluidic mixing devices, components for fluid handling, sampling vessels, and mechanical components for translating or transporting system components.

21 Claims, 19 Drawing Sheets

Related U.S. Application Data

(60) Provisional application No. 62/654,335, filed on Apr. 7, 2018.

(58) Field of Classification Search
CPC ... G01N 2035/0418; G01N 2035/1058; G01N 35/1002; G01N 35/1079; G01N 35/1095
See application file for complete search history.

(56) References Cited

U.S. PATENT DOCUMENTS

| | | | |
|---|---|---|---|
| 2005/0169815 A1* | 8/2005 | van den Brink | G01N 35/1095 422/130 |
| 2005/0223822 A1 | 10/2005 | Ozbal | |
| 2006/0045806 A1 | 3/2006 | Winther et al. | |
| 2008/0318203 A1* | 12/2008 | Tran | G01N 35/1095 435/174 |
| 2009/0032730 A1 | 2/2009 | Erickson et al. | |
| 2009/0054222 A1 | 2/2009 | Zhang et al. | |
| 2010/0126286 A1 | 5/2010 | Self et al. | |
| 2010/0170566 A1 | 7/2010 | Harmala | |
| 2010/0294048 A1 | 11/2010 | McGuire | |
| 2011/0306052 A1 | 12/2011 | Belz | |
| 2012/0015428 A1* | 1/2012 | Seale | F04B 19/006 415/73 |
| 2012/0021422 A1 | 1/2012 | Spence et al. | |
| 2013/0132006 A1* | 5/2013 | Gwynn | B01L 3/021 702/55 |
| 2013/0244322 A1 | 9/2013 | Henon et al. | |
| 2014/0083175 A1* | 3/2014 | Geach | G01N 15/0205 73/61.71 |
| 2014/0090979 A1* | 4/2014 | Terray | B81B 7/02 204/601 |
| 2014/0120604 A1* | 5/2014 | Aguanno | G01N 21/6428 435/287.2 |
| 2014/0174206 A1* | 6/2014 | Akiyama | G01N 15/1484 73/863 |
| 2014/0220557 A1 | 8/2014 | Hart et al. | |
| 2014/0319380 A1 | 10/2014 | Plohnke et al. | |
| 2014/0349387 A1 | 11/2014 | Davies et al. | |
| 2015/0037803 A1* | 2/2015 | Park | G01N 35/0099 435/6.12 |
| 2015/0206729 A1* | 7/2015 | Inagaki | H01J 49/045 250/288 |
| 2016/0033543 A1* | 2/2016 | Stankus | B01L 3/502 435/6.12 |
| 2017/0227563 A1* | 8/2017 | Nishigaki | G01N 35/1011 |
| 2017/0285054 A1* | 10/2017 | Muz | G01N 35/00623 |
| 2017/0335271 A1 | 11/2017 | Maggiore | |
| 2018/0188278 A1* | 7/2018 | Drews | B01L 3/50273 |
| 2018/0238498 A1* | 8/2018 | Gaitas | G01Q 60/02 |
| 2018/0306831 A1* | 10/2018 | Hatamian | A61B 5/02 |

FOREIGN PATENT DOCUMENTS

| | | |
|---|---|---|
| WO | WO 2008025016 A2 | 2/2008 |
| WO | 2011/120004 A2 | 9/2011 |
| WO | 2015/051654 A1 | 4/2015 |
| WO | 2019/002286 A1 | 1/2019 |

OTHER PUBLICATIONS

JP Office Action in Japanese Application 2021-504141, dated Apr. 18, 2023, 13 pages (with English translation).

International Search Report and Written Opinion from counterpart International Application No. PCT/US2019/026335, dated Jul. 9, 2019.

International Preliminary Report on Patentability from counterpart International Application No. PCT/US2019/026292, dated Oct. 22, 2020.

International Preliminary Report on Patentability from counterpart International Application No. PCT/US2019/026335, dated Oct. 22, 2020.

International Search Report and Written Opinion from counterpart International Application No. PCT/US2019/026292, dated Jul. 1, 2019.

CN Office Action in Chinese Application No. 2019800376720, dated Nov. 30, 2023, 17 pages (with English translation).

* cited by examiner

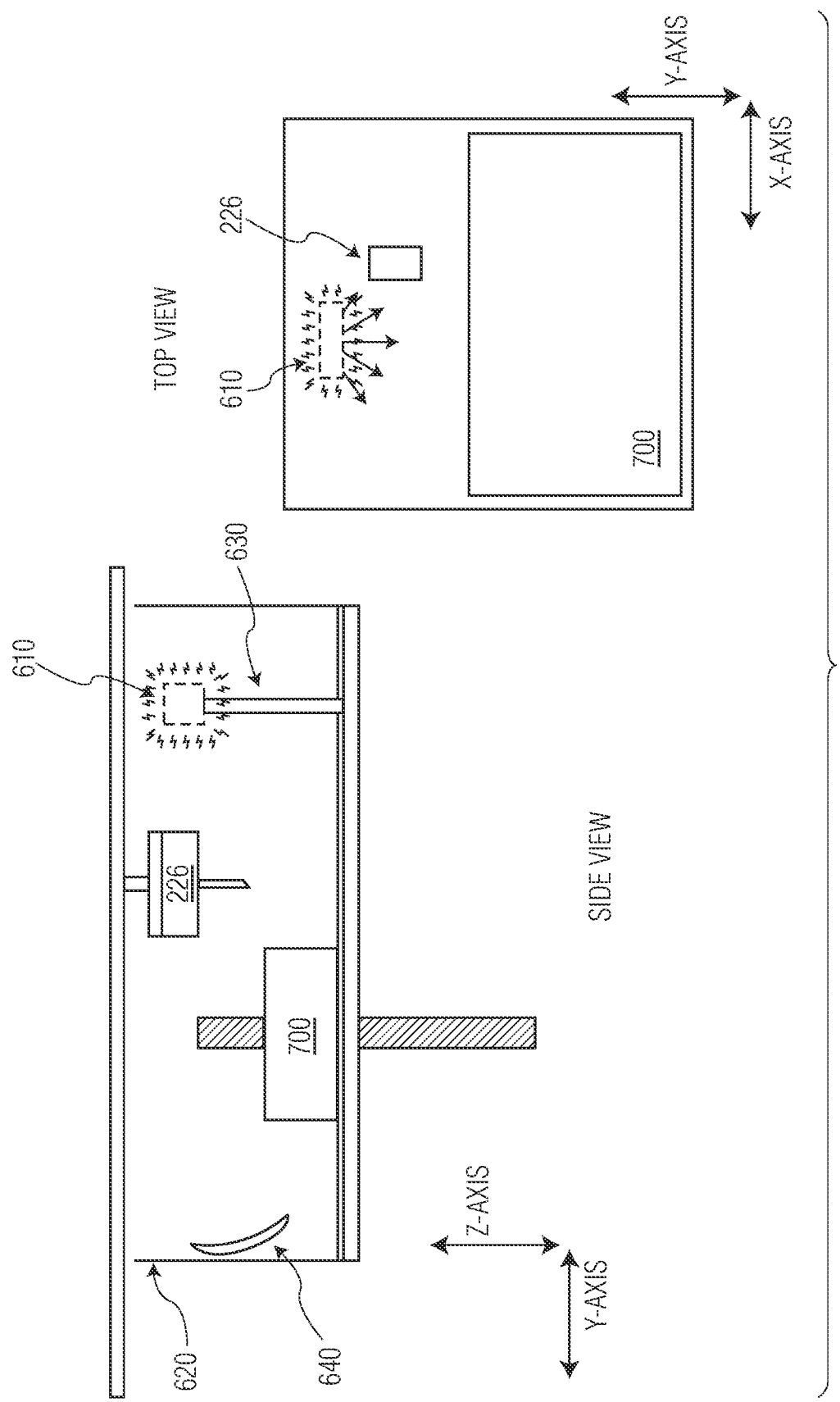

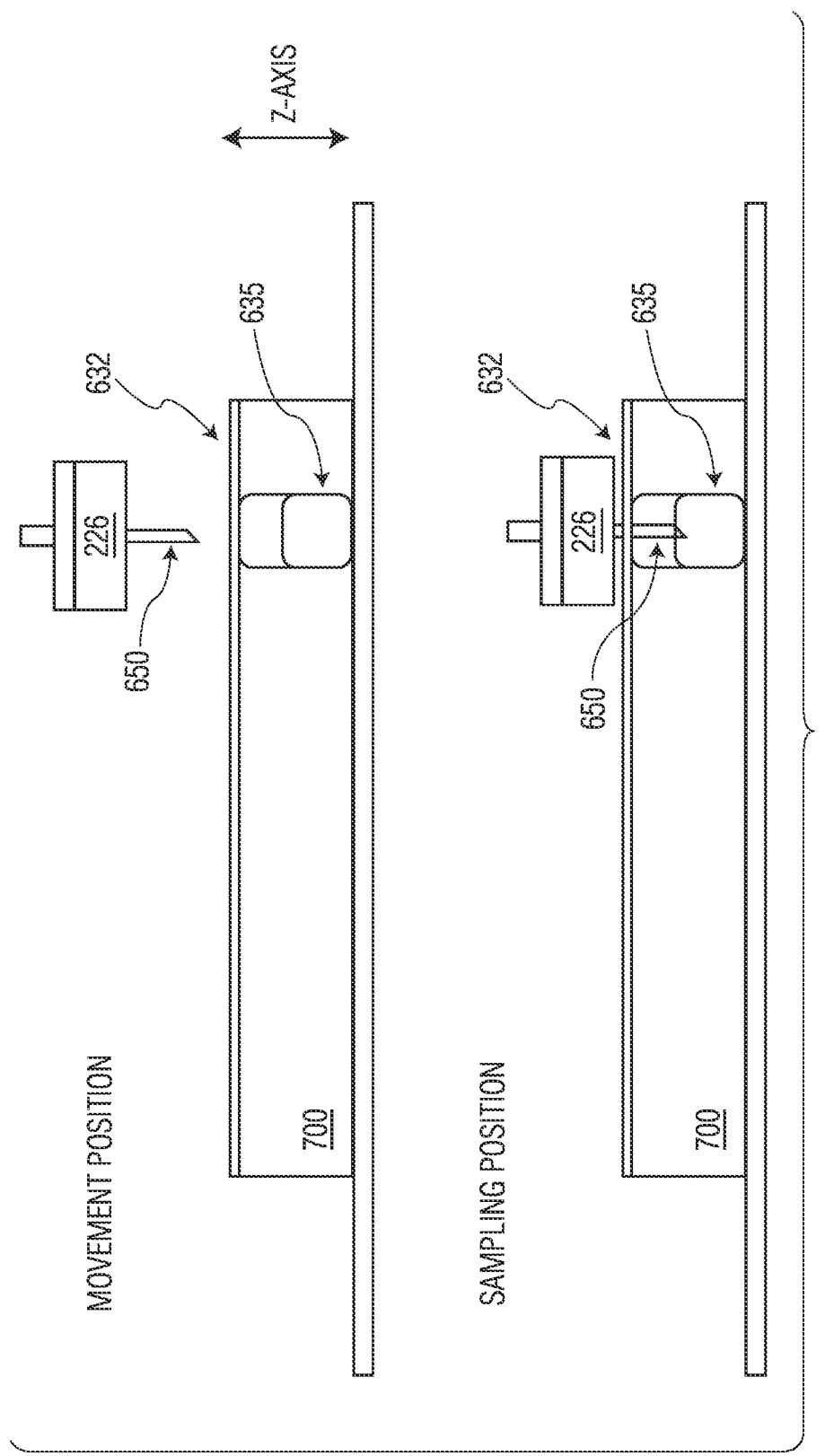

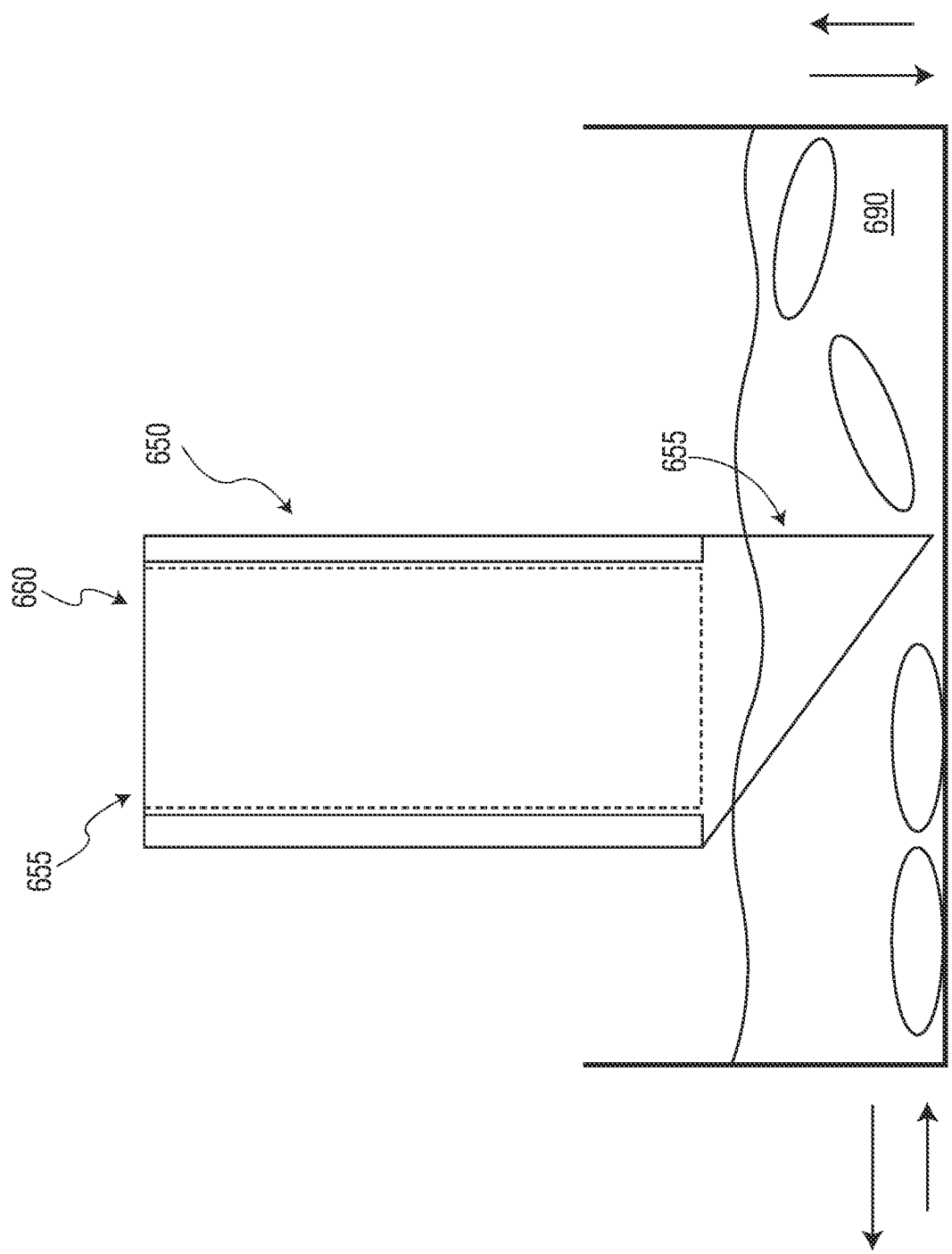

FLUIDIC AUTOSAMPLER AND INCUBATOR

FIELD OF THE INVENTION

Embodiments of the present disclosure relate to devices and methods of using the same that enable automated nano/micro/millifluidic sampling from one or more containers. The containers may comprise vessels ranging from one well or vial, to multiple multi-well plates. The devices provided herein are further capable of mixing the contents of individual wells, creating a sterile-field for biological investigation, and controlling parameters such as temperature, carbon dioxide concentration, and other cell growth conditions for material stability and monitoring of cell-based processes.

DESCRIPTION OF THE RELATED ART

The increased use of automated systems for sample storage, handling, and analysis has led to extensive research in the field of automation. Current sampling systems consist of robotic arms capable of moving a sample from a storage to loading zone for sampling, magnetic or mechanical stir members capable of keeping samples in suspension, and heated or cooled zones capable of regulating sample storage or analysis temperatures.

Prior art includes several automated sampling apparatuses encompassing various fields of analytical research (e.g.; Patent U.S. Pat. No. 4,713,974 for use with liquid chromatography) but are unable to be used for biological cellular analysis using Laser Force Cytology (LFC) due to lack of accurate and consistent nanoliter flow rate control, adequate sample mixing, and reliable temperature control for sample handling.

Wilhelm et al. Patent U.S. Pat. No. 4,816,730 describes the use of an apparatus for handling and moving a plurality of objects consisting of a robotic arm capable of vertical, horizontal, and rotational movement with a gripper mechanism for holding samples driven by electronically controlled stepper motors. While Schmidt et al. Patent U.S. Pat. No. 6,872,362 further describes the use of a powered autosampler having vial cup adapted to include a magnetic stir bar driven by a variety of different ways of changing the magnetic field around the vial cup. Although such prior art describes ways to move and mix a sample, these methods are not adequate for biological cellular analysis using LFC instrumentation. What is needed are improved devices that enable storage, mixing and sampling of vessels ranging from a single well to multiple multi-well plates while maintaining biological cellular integrity by adequate mixing and temperature maintenance through the use of pneumatic based non-contact mixing and a temperature-controlled single-well or multi-well plate blocks.

Automatic well plate stacking or retrieval systems that have robotic mechanisms are available that enable sequential stacking or retrieval vertically or horizontally (CN204136215U, US20040206419A1), utilize cassettes for loading and unloading (U.S. Pat. No. 9,744,535) or that describe whole-lot simultaneous stacking or retrieval of plates into a magazine or tower rack (U.S. Pat. No. 6,086,319). Further, previous designs enable the well plates to be loaded or removed from a storage tower in a random (non-sequential) manner irrespective of the order in which they are stacked (U.S. Pat. No. 7,670,555). What is needed however is the ability to achieve specific and automated detection, selection and stacking or retrieval of a desired well plate into or from a storage tower in a non-sequential manner utilizing magnetic interfaces and enabling well plate incubation which can be used in conjunction with multiplex analysis methods for automated sampling of such well plates.

SUMMARY OF THE INVENTION

Embodiments of the present disclosure relate to devices and methods of using the same that enable automated (and optionally incubated) nano/micro/millifluidic sampling from vessels ranging from one well or vial, to multiple multi-well plates. The devices are further capable of mixing the contents of individual wells, creating a sterile-field for biological investigation, and controlling temperature, carbon dioxide concentration, and other cell growth conditions for material stability and monitoring of cell-based processes.

More specifically, the novel devices described herein accomplish fluidic monitoring, including but not limited to, determining milli/micro/nanofluidic flow rates as well as de-bubbling, through the use of electronic pressure controllers and/or regulators used in concert with a flow meter. The novel devices further enable sample mixing by injecting small air bubbles in to the sample well or vial or by aspirating and dispensing the sample or air through the use of a vacuum pump coupled to an electronic pressure controller (EPC). Additionally, the invention has the ability to create a sterile-field around a needle and well-plate area using means such as ultraviolet radiation to ensure that biological material does not contaminate the instrument housing. The device is further designed to optionally incubate samples prior to sampling by controlling the temperature of the samples through the use of thermoelectric cooling modules. By reversing the current across the modules, the thermoelectric coolers are also capable of modifying the temperature, heating or incubating the sample as necessary. Mixing, sterilization and temperature control can be performed in isolation, in sequence, and/or concurrently depending on device set-up.

BRIEF DESCRIPTION OF THE DRAWINGS

FIGS. 6A-1, A-2, B, and C provide schematics demonstrating representative ultra-violet sterile-field. FIG. 6A-1 provides a front view, FIG. 6A-2 provides a side view, FIG. 6B provides a system for sterile mixing and sample delivery.

FIG. 10A shows the cells laying in the floor of a vessel/vial, FIG. 10B shows the cells having been dislodged/detached from the floor of the vessel/vial.

FIG. 12 provides a schematic demonstrating an embodiment of a cell detachment method comprising the use of a scraping tip/adapter.

DETAILED DESCRIPTION

Figure 1:
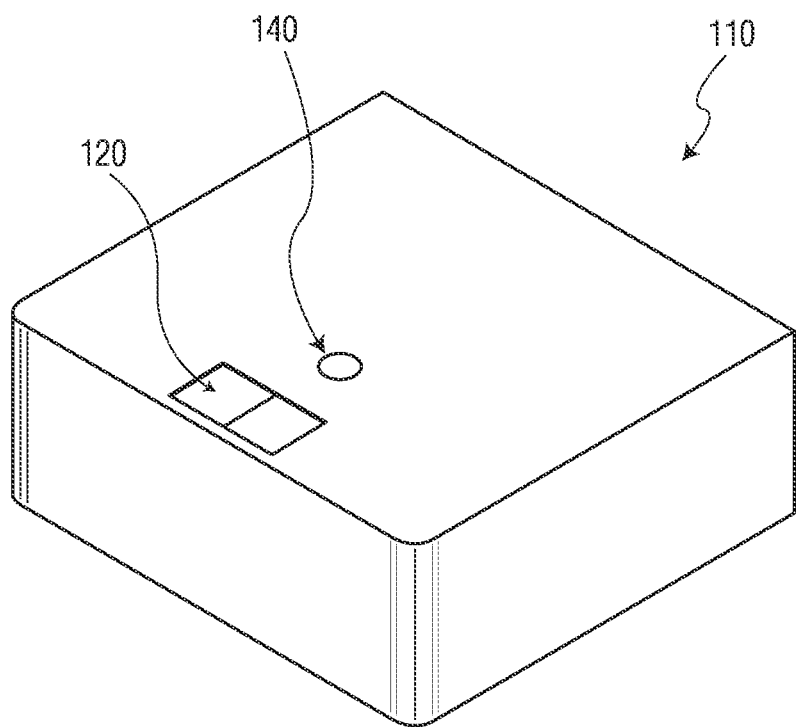
FIG. 1 provides a schematic showing the outside casing of an embodiment of the invention, the "autosampler".

The present invention is described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. One skilled in the art will recognize that the systems and devices of embodiments of the invention can be used with any of the methods of the invention and that any methods of the invention can be performed using any of the systems and devices of the invention. Embodiments comprising various features may also consist of or consist essentially of those various features. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as would be commonly understood or used by one of ordinary skill in the art encompassed by this technology and methodologies.

Texts and references mentioned herein are incorporated in their entirety, including U.S. Provisional Patent Application Ser. No. 62/654,335 filed on Apr. 7, 2018.

Provided herein are novel devices for automating the analysis of samples, wherein the samples are present in vials, vessels, wells, multi-well plates and the like; also provided are methods for using such devices. The devices may be referred to herein as an "autosampler". In certain embodiments, the autosampler may be used for obtaining samples of a desired and/or predetermined volume for analysis by a machine, or by hand. For example, the autosampler may be used for retrieving nano/micro/millifluidic samples from a multi-well plate, vials or other vessels, such samples can be of various volumes and consist of various cells or particles. The autosampler then presents the sample in an appropriate medium/configuration/vessel for analysis by fluidic based instruments or systems for liquid, particulates, or cells, such as for example, instruments that use Laser Force Cytology (LFC).

Referring to the Figures, FIG. 1 provides a schematic overview of an embodiment of the outside of the autosampler device (110) where single or multiple multi-well plates or vials can be loaded onto a plate block (216 see FIG. 2) when the bifurcated door (120) opens. In alternate embodiments, the door, may remain open or consist of a single retractable or collapsible door or other opening design permutations. 140 is an ingress and egress point for sample fluidics to move from 110 to 410 or other LFC or optics-based technology.

Figure 2:
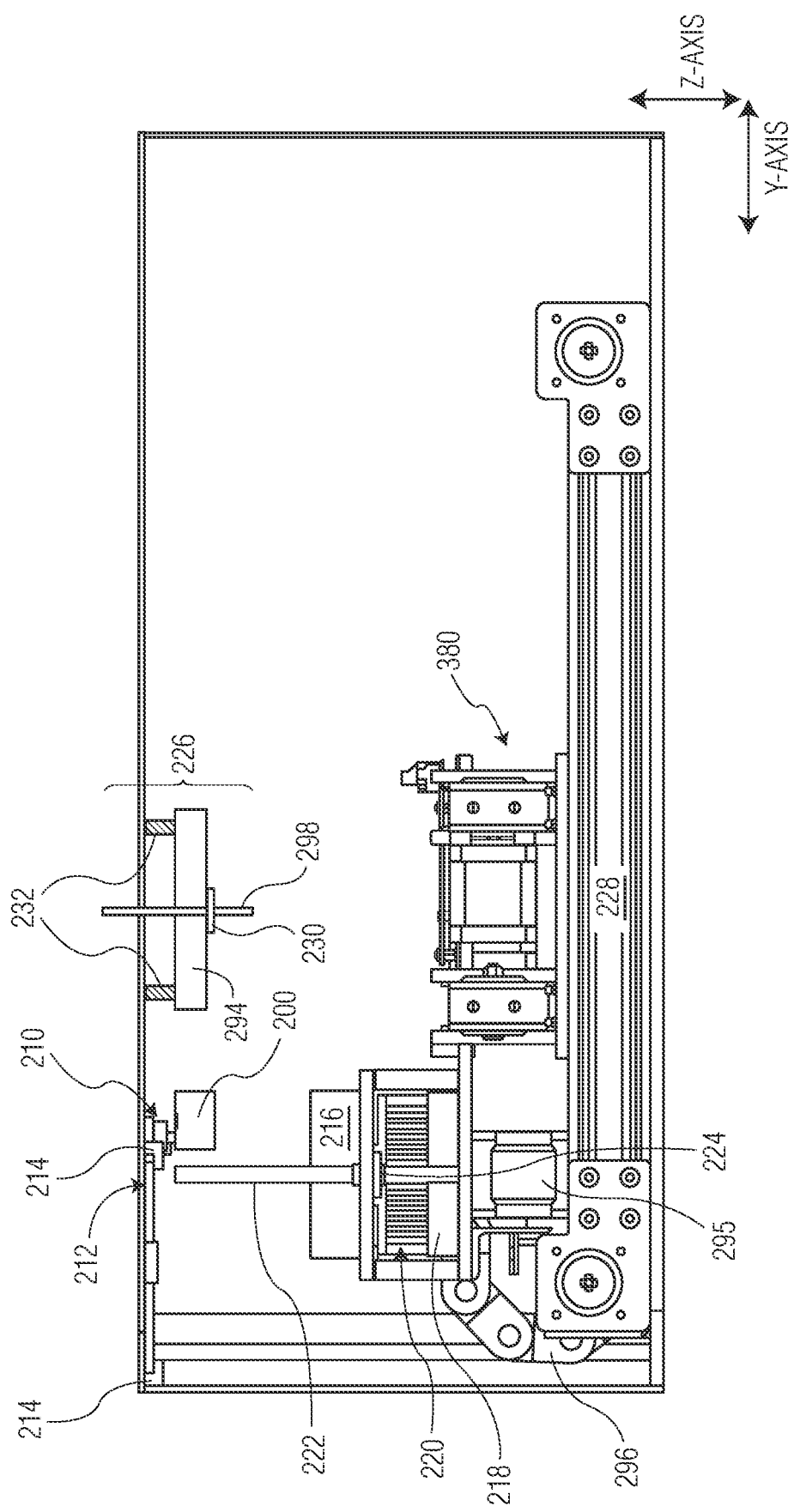
FIG. 2 provides a horizontal schematic showing the inner workings of the autosampler and needle manifold assembly.
Figure 3:
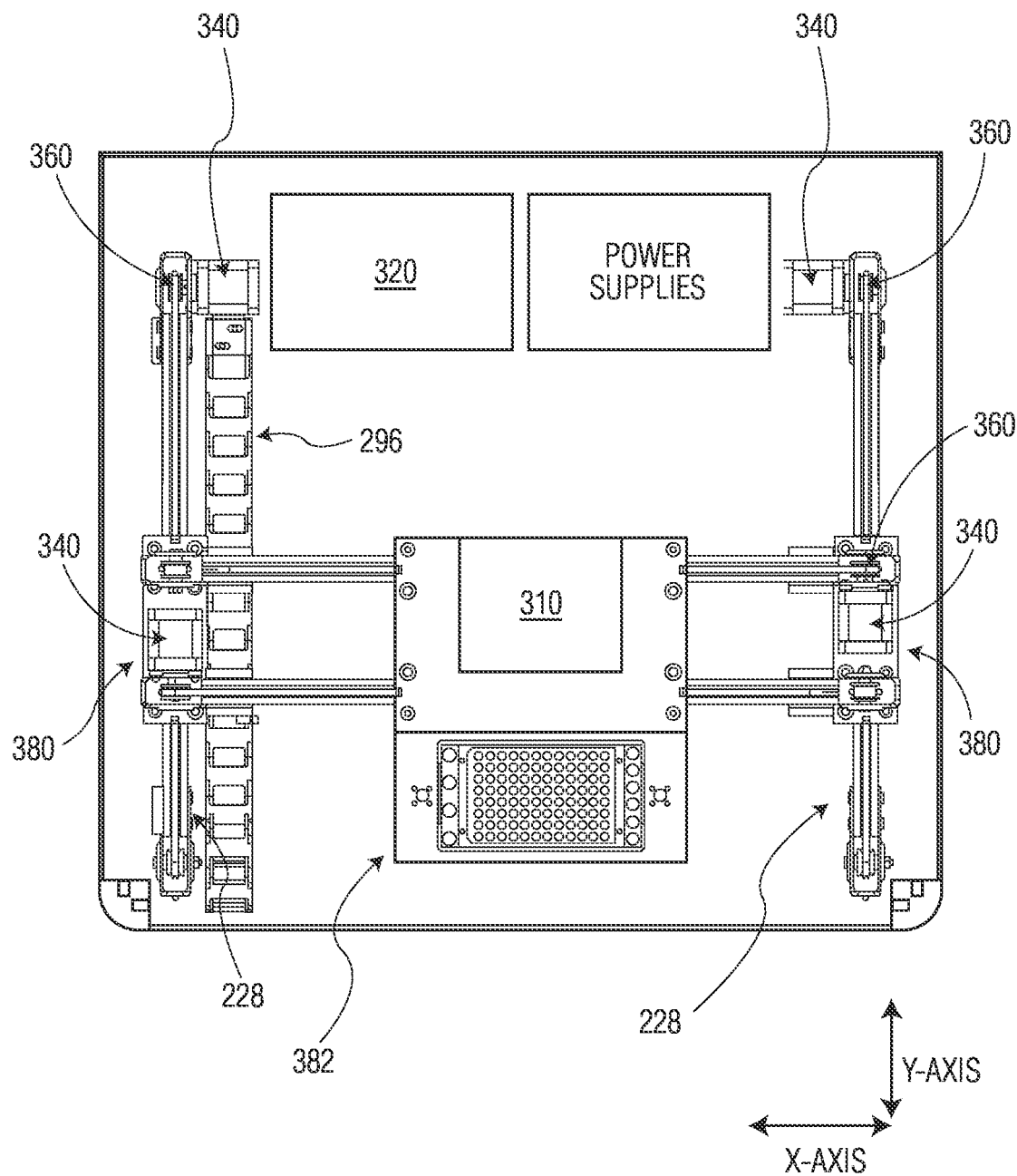
FIG. 3 provides a top-down view illustrating the movement stages inside the autosampler.

As illustrated in FIGS. 2-3, in an embodiment, 120 of FIG. 1 opens utilizing two motors (200) driven by a controller board (for opening and closing the autosampler door). The motors turn a ring gear (210) that engages a toothed door rack (212) in order to slide open the doors in low friction channels (214). The samples are loaded into a well-plate that fits on a temperature-controlled block (216) that may be heated or cooled as needed.

The needle and needle manifold assembly (226) are comprised of a suitable material such as a flexible polymer, plastic, silicone, carbon, or metal base (any alternative material for purpose will work) that holds the needle (298) and pneumatic connection (294), a sealing surface to seal vials or well plates (230) and a spring-loaded support structure (232) to facilitate better sealing. The needle may be composed of a multi-tube design wherein a dedicated sample and mix tube are housed within the outer structure of the larger diameter needle. In certain embodiments the needle may comprise additional modifications such as a sharp end for piercing plate seals.

In certain embodiments, travel rails (228) are positioned to enable movement of the inner workings along X- and Y-axis and cable carriers (296) are fitted to ensure cables can move safely when in motion. 296 not pictured for X-axis. An additional motor or set of motors (295) enables motion in the Z-dimension by turning the lead screw which in turn moves the block (216).

In certain embodiments, temperature control of 216 may be achieved using a thermoelectric cooling (TEC) module and a thermistor connected to a temperature control board (310 (see FIG. 3)). The temperature control can include heating or cooling of the sample. Fans (218) run constantly or as needed to remove heat from the heat sinks (220). 216 and subsequent components are coupled to moving platforms where 216 can be transported within the confines of the autosampler on the X, Y, and Z axis. The motion is controlled by a combination of an industrial computer (320) and motors (340). For X and Y travel the industrial computer-controlled 340 turn a timing pulley (360), which drives a belt to move the gantry plate along its Y- (380) and X- (382) axis. For Z travel the industrial computer driven 340 both contain lead screws (222). 222 are used to generate up and downward Z-axis motion through the use of Delrin travel nuts (224). Any travel nuts for purpose can be utilized. The motion control in any axis may or may not have positional feedback.

Figure 4:
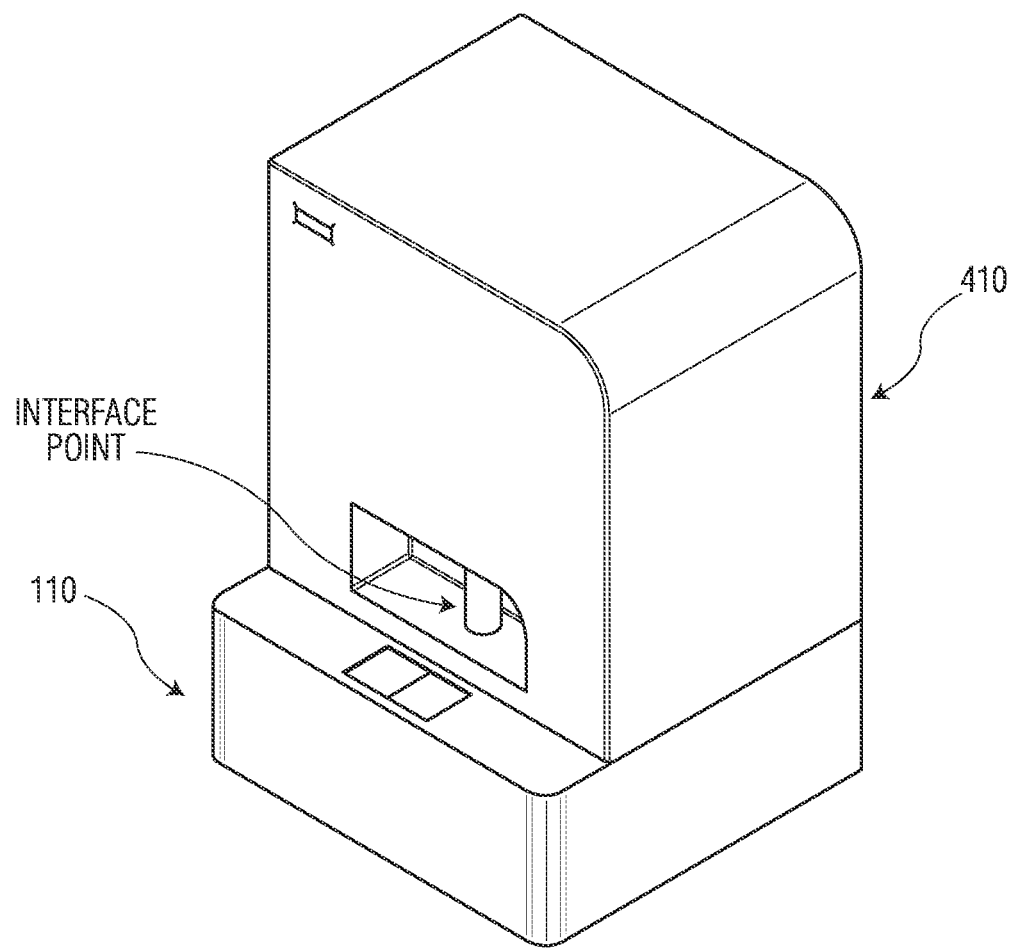
FIG. 4 provides a schematic demonstrating an autosampler interfacing with a Laser Force Cytology instrument (Radiance™)

FIG. 4 illustrates the interface between 110 and the Radiance™ instrument (410) which is an available embodiment for application of 110. 110 could, in the alternative, be modified for application to any LFC, optical force, microfluidic, or other instrumentation. In an embodiment, the interface between 110 and the other instrumentation is as shown in FIG. 4 and allows for transfer between the two instruments, including but not limited to fluids, samples, and electronic signals, communication, or other information.

Figure 5:
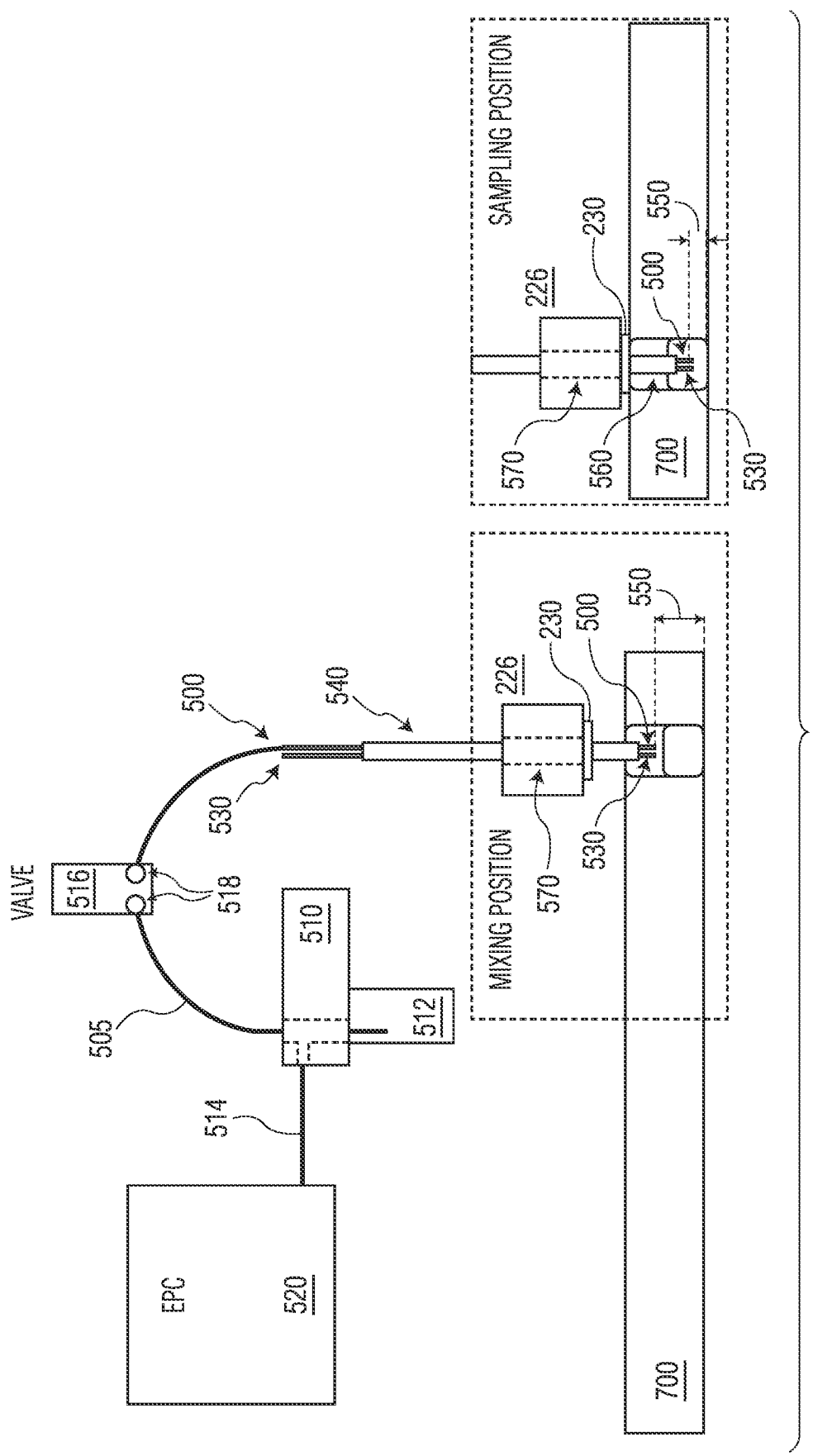
FIG. 5 provides a schematic showing a diagram for automated mixing.
Figure 5A:
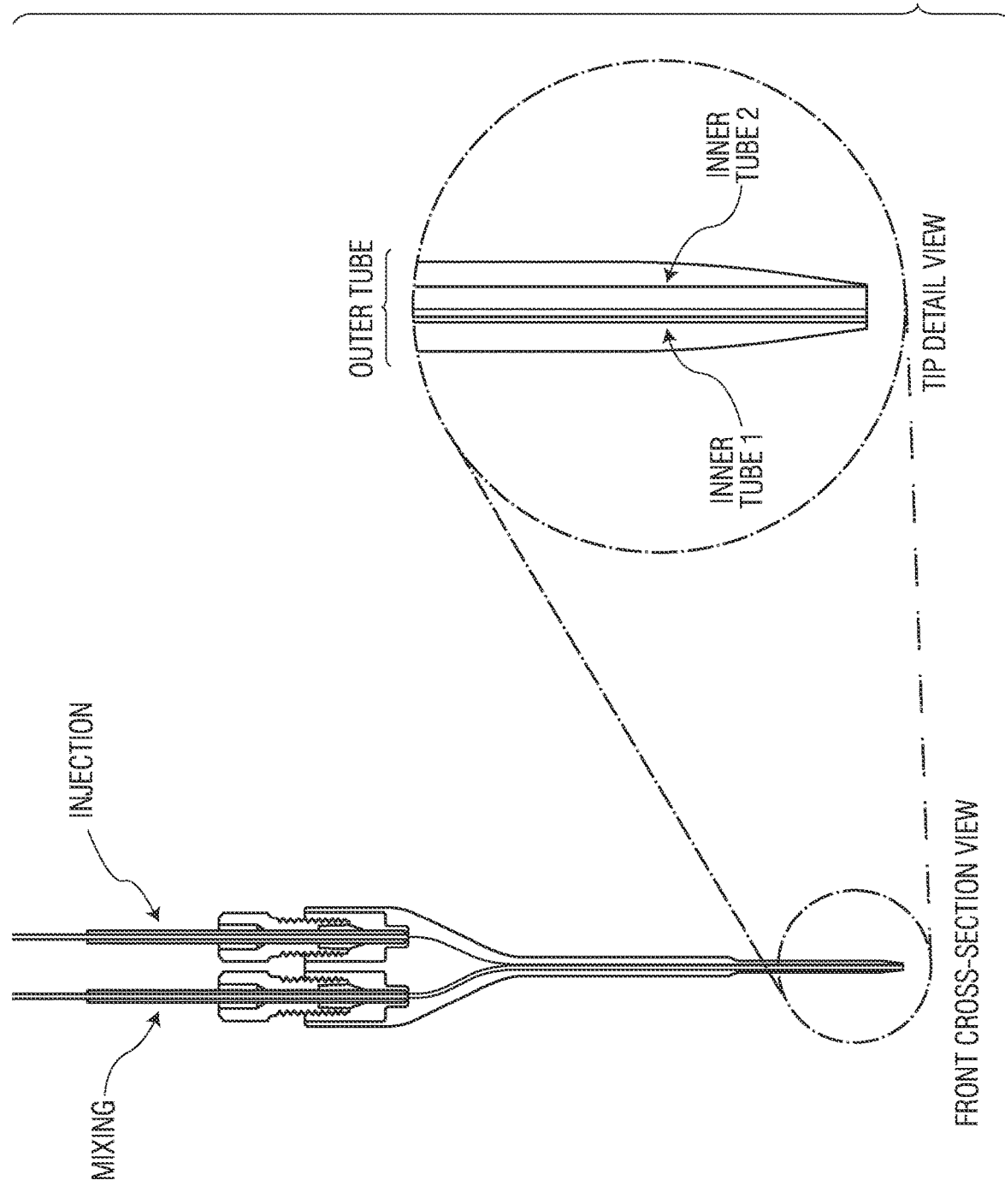
FIG. 5A provides a schematic showing an embodiment of a microfluidic needle design.
Figure 5B:
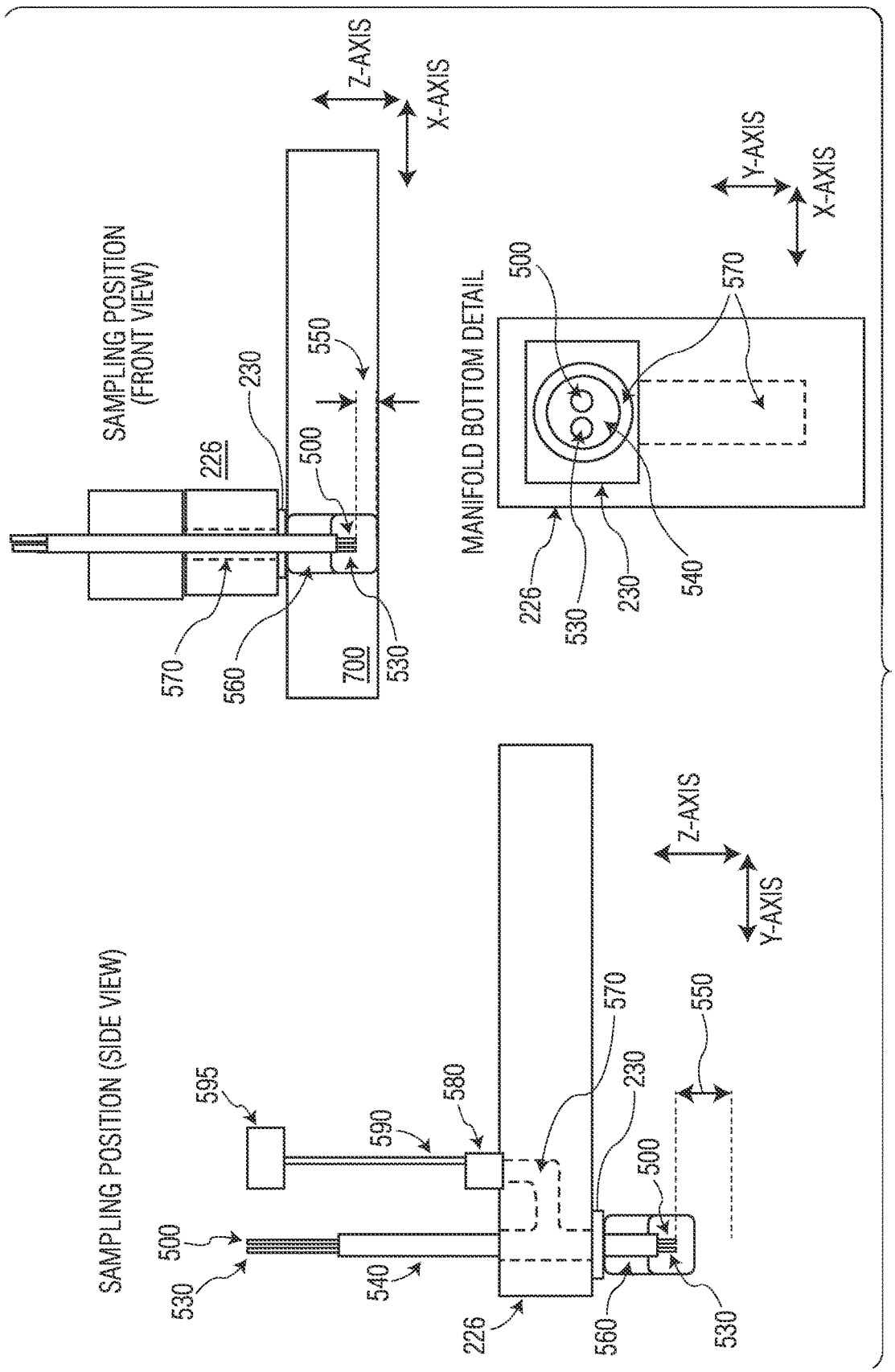
FIG. 5B provides the automated sampling and mixing manifold detail.

FIG. 5 Illustrates an embodiment of the automated sampling and mixing system. To facilitate sample integrity while mixing, the Z-distance (550) between the bottom of the sampling tubing (530) and the bottom of the sampling vessel (as shown a multi-well plate) can be adjusted to fine-tune the pneumatic mixing system on a per-sample basis. Sampling is accomplished by physically moving or pressing the vial or well plate (700) against the needle manifold assembly (226). The sealing surface or gasket (230) is used to create a seal between needle manifold assembly and the wellplate (700) or vial. The flow rate into or out of the vial or sampling well can then be adjusted by controlling the pressure in the headspace (560) of the vial or sampling well. This is enabled by the inner chamber (570) as shown in detail in FIG. 5B. As shown in the Side View in 5B, the inner chamber (570) is open at two locations on the top and one on the bottom. The two top locations are where the manifold connects in an air tight manner to the outer tube (540) and a fitting (580), respectively. The bottom location is an additional open location connected to the inner chamber on the bottom of the manifold (226), shown in the Manifold bottom detail. The outer tube (540) passes through the inner chamber (570), protruding through and extending out from the manifold (226) as shown. This allows the outer tube (540) to be submerged in the sample during sampling. However, the outer diameter of the outer tube (540) is smaller than the diameter of the inner chamber (570), enabling an air tight seal to be made when the well plate or vial is pressed against the sealing surface (230). There is tubing (590) that attaches to the top of the manifold (226) via the fitting (580) in an air tight manner. The tubing (590) is connected to an electronic pressure controller or some alternative pressure or vacuum source (595) as shown. By adjusting the pressure of the source (595) the pressure in the head space 560 can then precisely controlled. Note that this is one particular embodiment and other embodiments could have a larger number of openings in the manifold as needed. Mixing and sampling both use separate tubes (500 and 530 respectively) that share a larger outer tube or needle (540). The inner tubes (500 and 530) may consist of different or identical diameters to improve or modify mixing or sample delivery as needed. The material of the inner and outer tubes can be different and may consist of metal, plastic, ceramic, composite, glass/capillary, carbon fiber, composite, or other suitable materials. The inner tubes may be connected to the outer tube with a variety of connectors. These connectors between the inner and outer tubes could be reusable, such as a fitting, sheath or other housing, or permanent, such as glue or epoxy. The tubes may also be constructed out of a single material or multiple materials using 3D printing or other manufacturing techniques. An example design is shown in FIG. 5A. In an embodiment, a vacuum-enabled electronic pressure controller (EPC) (520) is connected to tubing that may be connected directly to a manifold (510) that contains a vacuum trap (512) that serves to prevent liquid from entering 514 and 520. The manifold 510 and vacuum trap 512 connect to form an air tight seal, allowing for a pneumatic connection between the tubing 514 and tubing 505. Tubing 505 connects to a valve such that the vacuum source can be isolated from the 0tubing 500 on the other side of the valve and the sample contained in the well plate 700 or sample vial. The valve could be, but is not limited to, a solenoid valve, pinch valve, rotary valve, or ball valve. Tubing connects on both sides of the valve creating an air and liquid tight seal.

In order to mix the contents of a sample, a vacuum-enabled EPC (520) first applies a negative pressure to a length of tubing (514). At a similar time (earlier, simultaneously, or later), the valve 516 is opened to allow the negative pressure to propagate through 512, 505, 516, and 500, enabling liquid to be withdrawn from the sample vessel into mix tubing. After a set period of time, the EPC switches from a vacuum regime (PEPC<Patmospheric) to a positive pressure regime (PEPC>Patmospheric) in order to reverse the flow of liquid and dispense it back into the sample well. This cycle may be conducted one or multiple times to properly mix the sample. Once a sample is thoroughly mixed the sample is withdrawn by the LFC or other instrumentation 140. The samples can be taken by utilizing a headspace pressure-based sampling method or by vacuum within the instrument.

Figures 1, 6A:
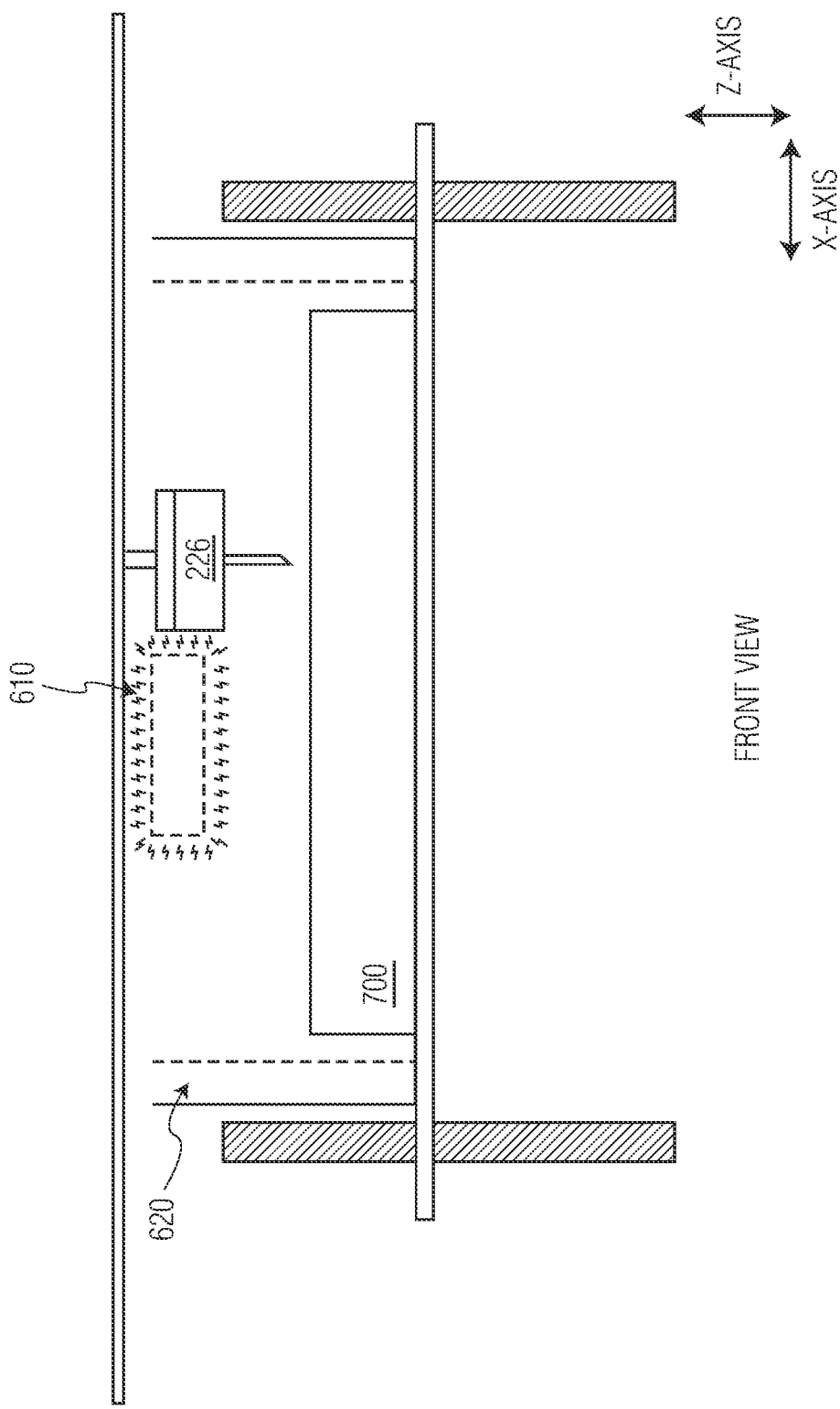

FIG. 6A illustrates a method for creating a sterile-field within 110, or other autosampler systems, by utilizing an ultra-violet (UV) germicidal lamp, light-emitting diode (LED) or other light source (610), at a desired power and distance, fitted in single, double, or other spacing variation, and placed at the rear, front, side, top or bottom of the space to be sterilized and attached or affixed to or near reflective shielding. The front view of one embodiment is shown in FIG. 6A-1 and the top and side views are shown in FIG. 6A-2. The field to be sterilized can be contained by continuous or targeted placement of polished aluminum, or any other sufficiently reflective material (620). This shielding also serves the purpose of protecting internal cabling and other components from repeated UV exposure while the field to be sterilized is sufficiently exposed to the UV light. The shielding may also be in the form of a mirror, lens, or other optical element 640 designed to focus and/or reflect the UV light to a specific location. The UV source 610 may be mounted to a static component of the autosampler 110 or can be mounted to the same plate as the well plate 700 or other location to allow for motion of the UV source relative to the needle assembly 226. In addition, the well plate 700 may be moved along the Z axis to provide a favorable position for sterilization. A UV source might also be incorporated directly into the well plate block 216 to sterilize the needle assembly 226. The well plate block would be moved into position below the needle assembly such that the UV source contained within the block would sterilize the needle assembly. Additional structures or support elements 630 could be integrated to help position the UV source. The power and time required for sterilization is determined by calculating the energy needed to achieve the kill factor for the target to be eliminated.

Figure 6C:
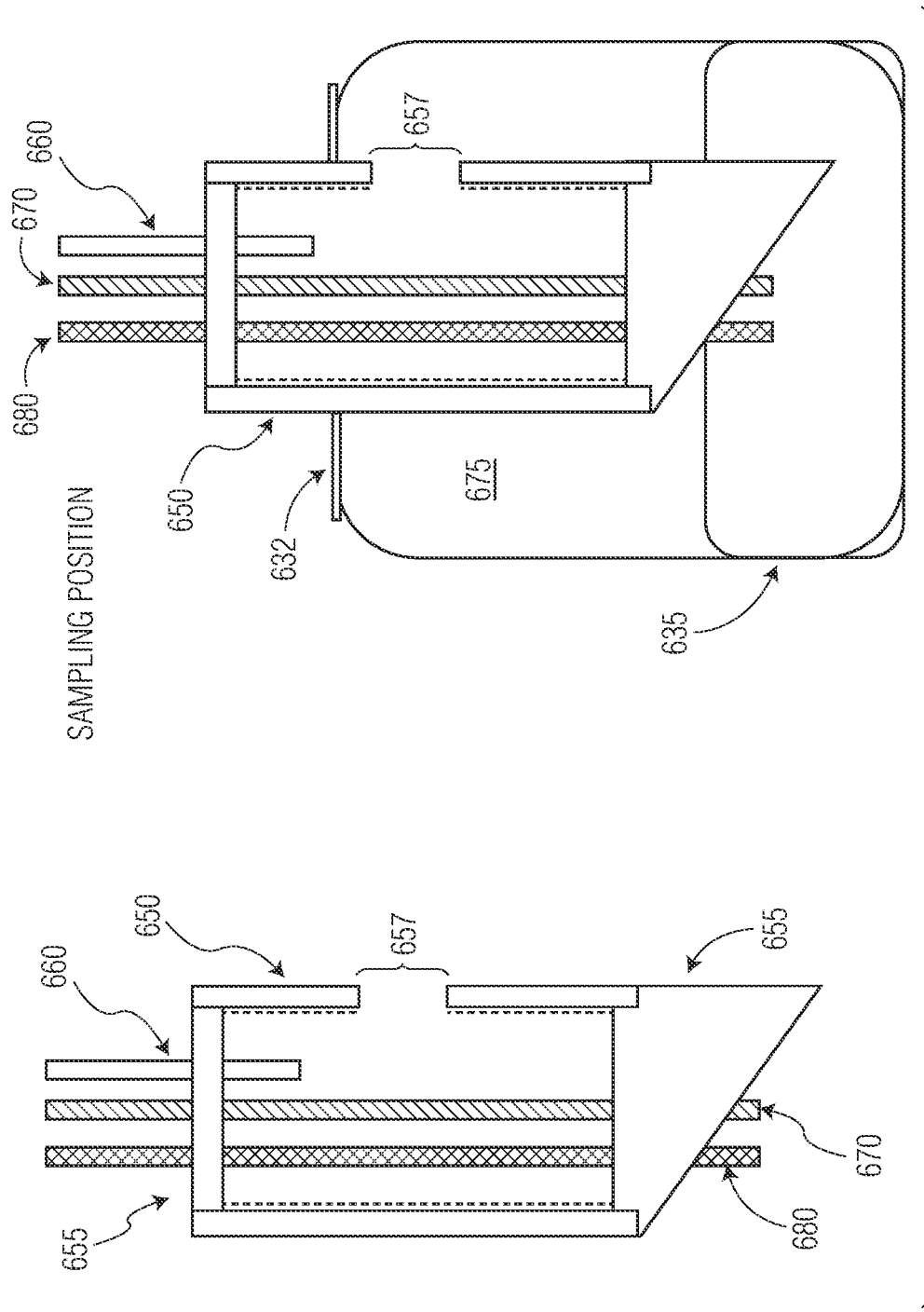
FIG. 6C provides the sterile tube detail.

FIG. 6B System for sterile mixing and sample delivery. In order to maintain sterility of the sample during movement from an incubator, biological safety cabinet, laminar flow hood or other device to the autosampler 110, the well plate may be covered with an air tight seal 632. This seal may be made of rubber, polymer, silicon, Viton™, plastic, or any other suitable material. Once inside the incubator, the sample remains sealed during movement as the needle assembly 226 is positioned above the well plate. During sampling and mixing, the plate is moved vertically in the Z dimension such that the needle assembly pierces the seal 632 of the plate to access the sample (Sampling Position). Further detail of an embodiment is shown in FIG. 6C. As seen in a cross-sectional view, the outer tube 650 contains 3 interior tubes for mixing (680), sample delivery (670) and pressure modulation (660). The outer tube may be blunt at the bottom, cut at an angle as shown, or otherwise constructed to allow for easy penetration of the seal 632. The interior tubes may consist of different or identical diameters to improve or modify mixing, sample delivery, or pressure modulation as needed. The material of the inner and outer tubes can be different and may consist of metal, plastic, ceramic, composite, glass/capillary, or other materials. The inner tubes may be connected to the outer tube with a variety of connectors. These connectors could be reusable, such as a fitting, sheath or other housing, or permanent, such as glue or epoxy. This connection between the interior and exterior tubes creates an air tight seal as indicated by 655. The pressure modulation tube (660) is connected to an electronic pressure controller that can modulate the pressure of the air in the tube. There is also a hole or notch (657) above the bottom of the tube that allows air and pressure changes to pass between the interior and exterior of the outer tube. In the sampling position (sampling position is when the bottom of the needle is submerged below the liquid and the air tight seal has been pierced), the needle assembly pierces the seal 632 such that the mixing tube 680 and sample delivery tube 670 are submerged, but the notch 657 is above the surface of the liquid and below the seal. This creates an enclosed volume 675, the pressure of which can be controlled by the EPC connected to the pressure modulation tube 660. This allows for sample to be pushed up into the sampling tube 670.

Figure 7A:
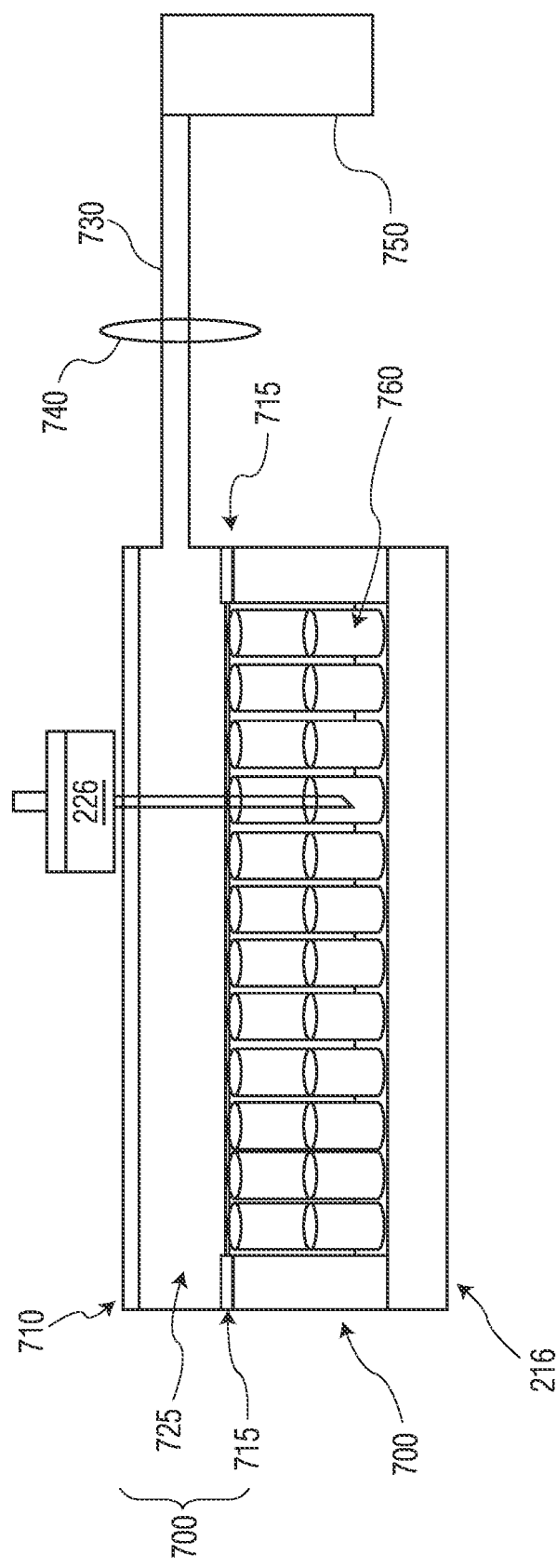
FIG. 7A provides a schematic of an embodiment showing an individual well-plate incubator.

The ability to continuously incubate a single plate under ideal culture conditions requires the incorporation of a self-contained incubation chamber which can reside as shown in FIG. 7A at 110 for the duration of the desired sampling time. The design may be adapted for multiple well plates of various sizes where the X- and Y-axis are able to accommodate movement of the plates around 226. Attached to the top of the well plate (700) would be an incubation chamber (720) that could be made of plastic, plexiglass, glass, or other suitable material. The top of the chamber would have a seal (710) that could be pierced by the sampling needle but remain air tight. The chamber may also have a seal around the bottom edges (715) to create a seal along the edge of the well plate. In an alternate embodiment, the well plate 700 and incubation chamber may be combined into one monolithic piece that would still contain the top seal 710 but would not require the bottom seal 715. This would create a headspace 725 that could be controlled to create the proper conditions for cell growth. Temperature control of the chambers is enabled by modulating the temperature of 216, whereas CO2 is pumped into the chamber via a tubing or hose (730) that fits into 720 and is adapted with a commercially available HEPA filter (740) to maintain sterility. CO2 and O2 could be provided from a source such as a compressed gas cylinder 750. The system could be fitted with additional sensing nodes to monitor pH, dissolved gases (O2, CO2, etc.) metabolites, or any other detectable requirement. Cells would grow in the chambers and be periodically sampled by piercing the top seal with the needle assembly. Cells could be transferred from the sampling well by increasing the overall pressure of the headspace, using a vacuum-based system to sip cells from the well, or some alternate means.

Mixing of the sample contents to enable suspension cell growth (or any other goal) may be achieved by mechanical, magnetic, pneumatic, fluidic, or other means. Specific examples include but are not limited to magnetic beds in each well or vial, a magnetic stir bar or impeller actuated from below, above, or the side.

Figure 7B:
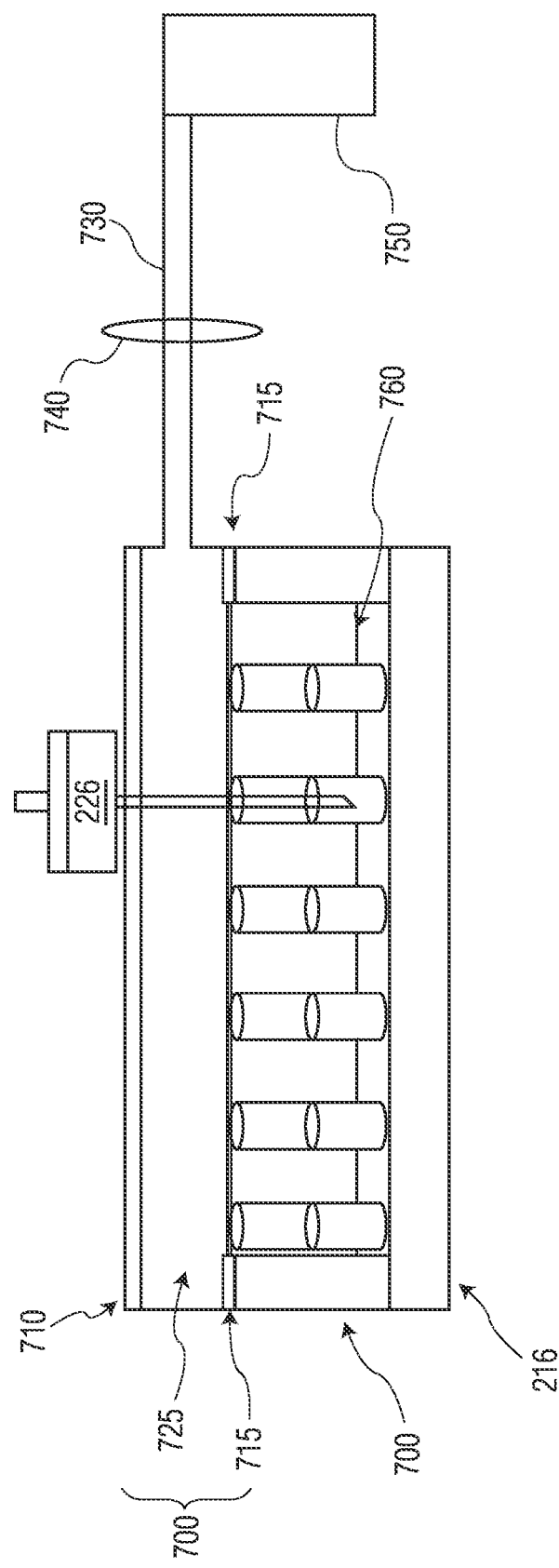
FIG. 7B shows individual wells or vial incubator FIG. 8 provides embodiments for carriage structures for multiplexing.

In an alternate embodiment, as shown in FIG. 7B, the wells may be replaced by discrete vessels, each with their own individual chamber 720 as shown. Gases would still be supplied and temperature would be controlled to achieve the ideal conditions for cell growth. Cells could be sampled in an identical fashion to what is described above.

Figure 8:
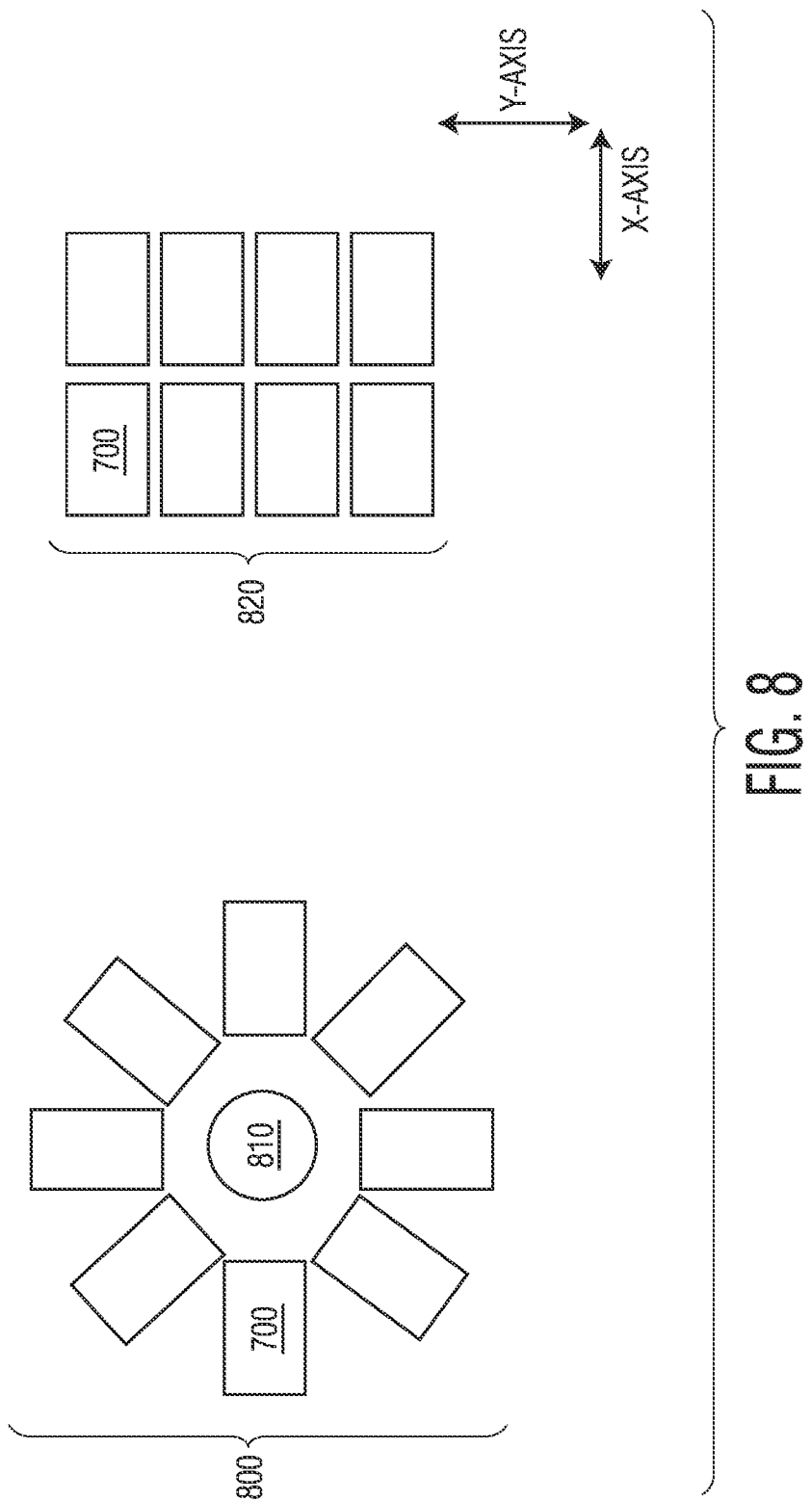

In order to create a multiplexed system where multiple plates can be sampled automatically, one or more carriage systems are enabled to support a base plate in either a circular (800) or square/rectangle for X- Y-array (820) as shown in FIG. 8. The multiplexed array may contain multiple self-incubated chambers or incorporate a larger incubation chamber into which all the samples are adjoined in parallel or series. A round 720 and 710 are enabled to incorporate 800. A pivot rod (810) attached to 216 would enable circular rotation of the well plates when moved via mechanical power. These multiple trays could move in the X, Y, and Z axes in order to access the sampling needle.

Figure 9A:
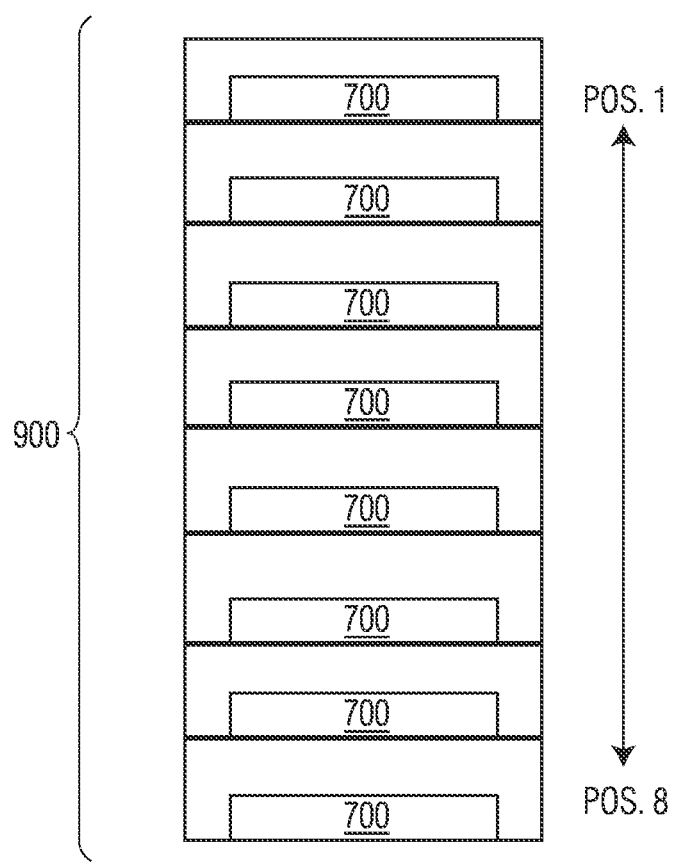
FIG. 9A provides a schematic for a multi-plate robotic handler, FIG. 9B provides an embodiment for a multi-plate robotic handler showing plates attached under normal operation, and plates detached for movement.
Figure 9B:
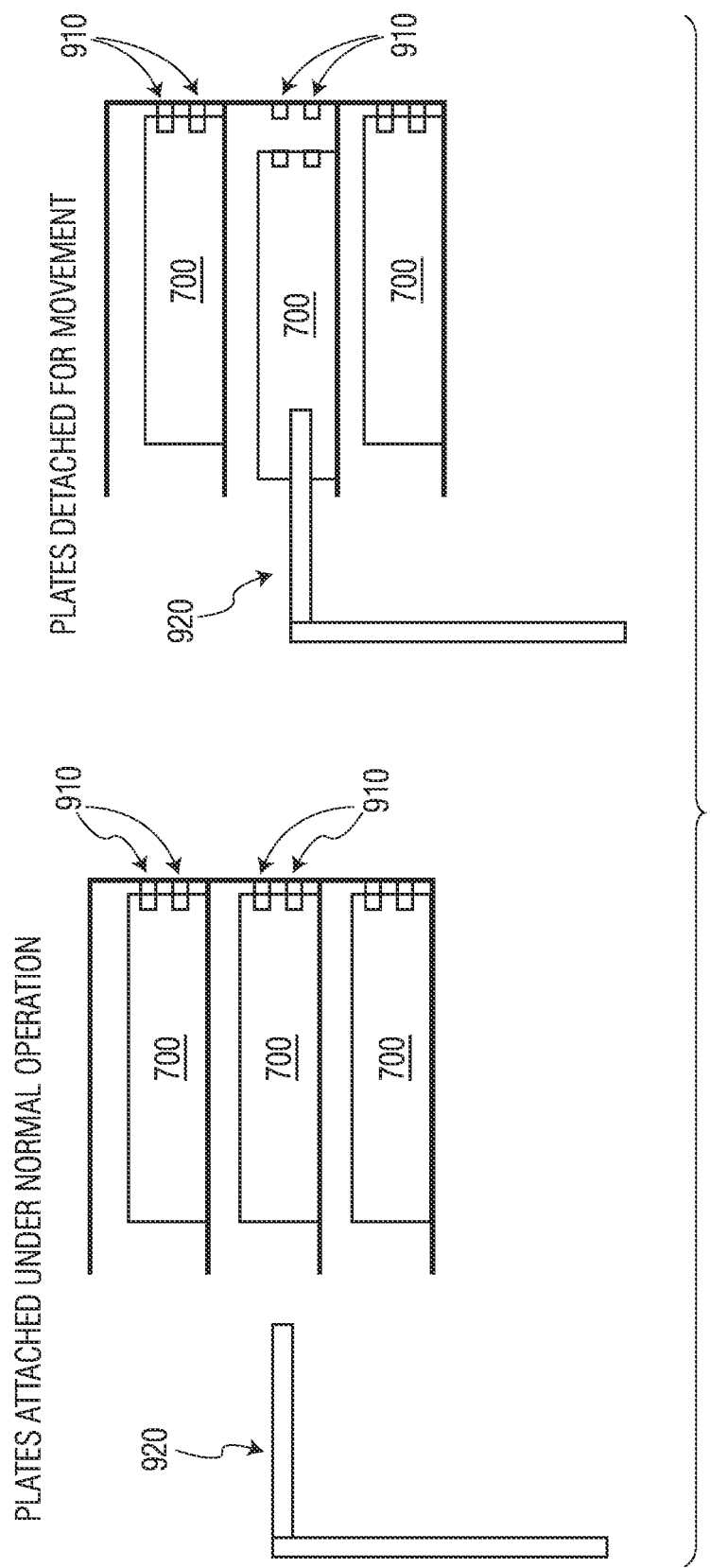
Figure 10A:
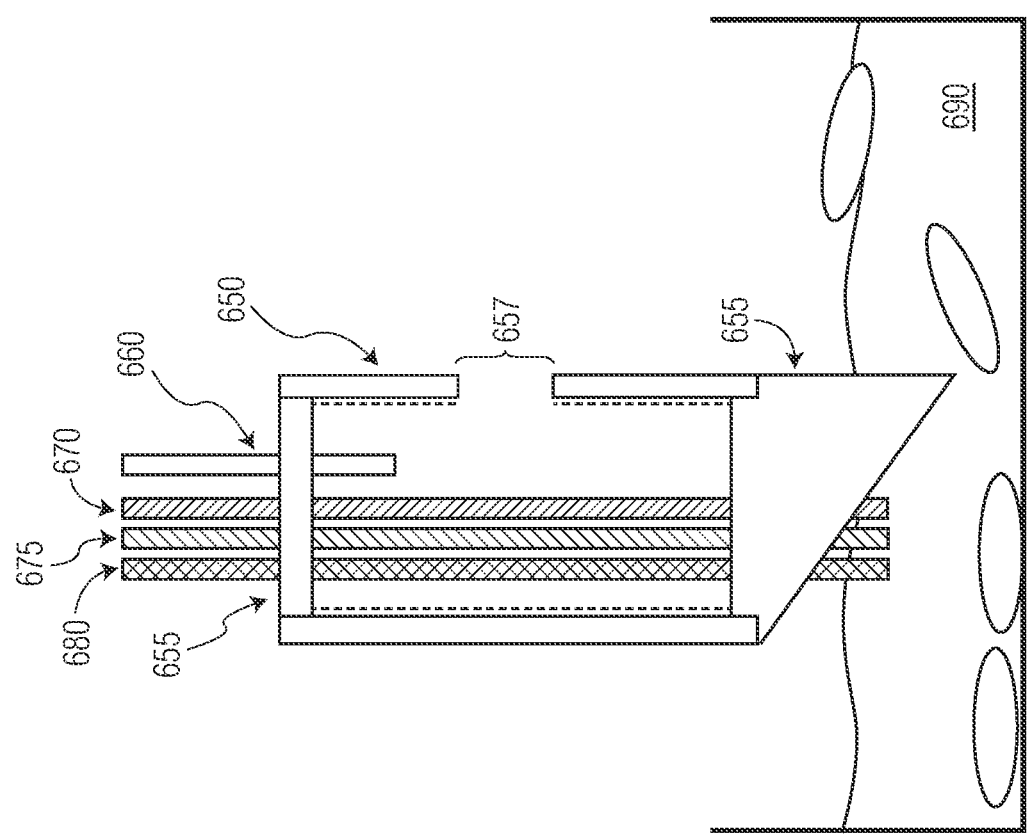
FIGS. 10A and 10B provide a schematic demonstrating use of an embodiment of the autosampler for cell detachment.
Figure 10B:
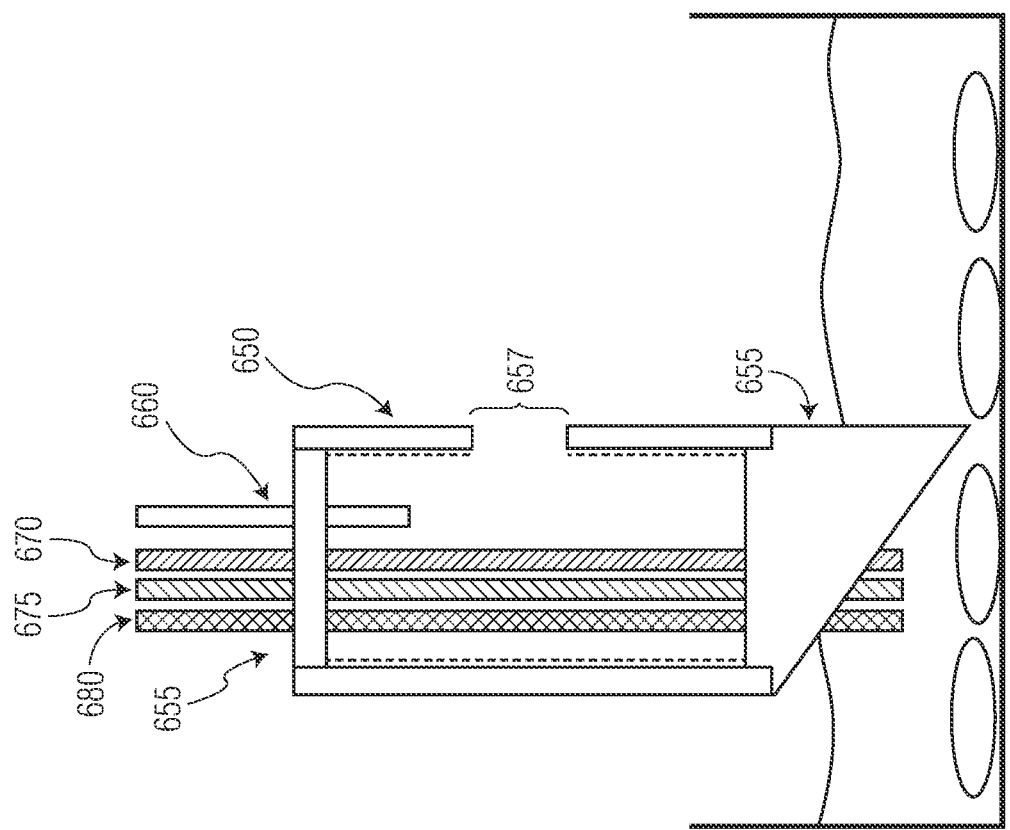
Figure 11:
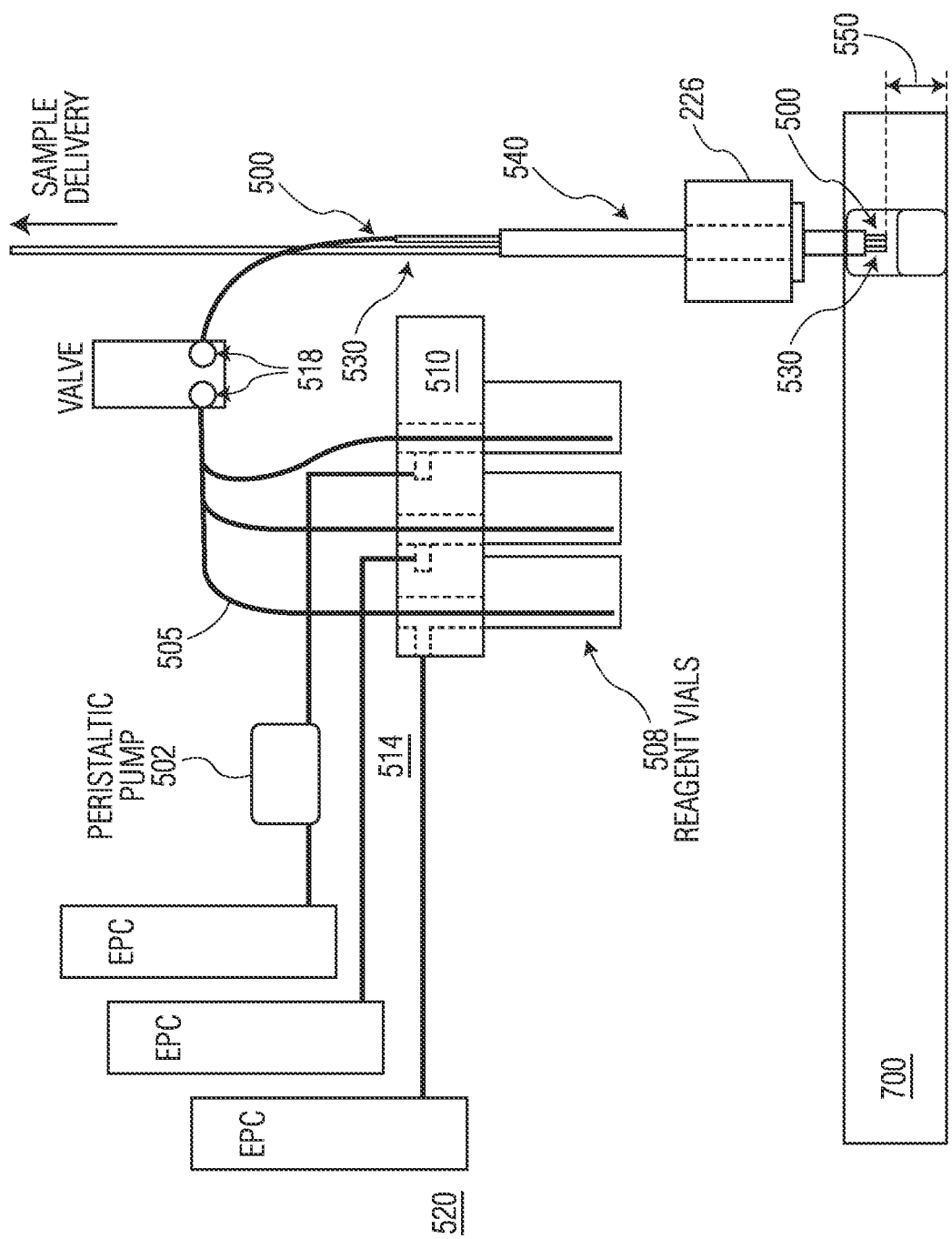
FIG. 11 provides a schematic demonstrating an embodiment of a reagent delivery system.

FIG. 9A illustrates a multi-plate storage tower (900) that is divided by fixed levels and can be used in conjunction with a robotic handler. The robotic arm can be programmed to retrieve plates at any space in the tower (e.g.; Position 1-8 in the Figure, where the number of trays can be increased or decreased according to design demand). This system may be integrated as part of the autosampler, sit directly below it, or be located adjacent to it. The robotic arm could use any number of methods for removing any of the plates, such as mechanical, magnetic (including electromagnets), electronic, or other means. The individual well plates used in this system may be designed in such a way to work in concert with the robotic system. In one embodiment for example, shown in FIG. 9B, the plates have magnets on two adjacent sides. During normal operation, the magnets 910 help to hold the plates in place. To move the plates, the robotic arm 920 provides sufficient force to break the magnetic bond holding the plate in the rack, removing the plate as shown. It can then be taken to the autosampler or other device for sampling. In one embodiment, the cells could also be returned to the tower after sampling. In order to accommodate cells that grow in an adherent fashion, the autosampler will be equipped with the ability to detach cells from the surface of their growth substrate. Several embodiments are shown in FIGS. 10A and 10B for this cell detachment method. The system may be comprised of some or all of the following components. Liquids can be removed or added from the well using dedicated tubing or removable tips. Once cells have been treated with reagent such as trypsin, TrypLE™, Accutase™, or other cell detachment reagent, either physical scraping with a soft plastic scraper, thin metal blade, or plastic blade attached to the tip, can be used to fully remove and suspend the cells. Alternatively, a stream of liquid can be used to suspend them, making them available for analysis including the mixing system described above could supply the needed flow stream to remove and resuspend cells. Liquid could be removed by the mixing system (FIG. 5) and then new fluid added (fresh PBS) from reagent addition system (FIGS. 10A and 10B) to resuspend the cells and wash away debris. Temperature control of the well plate block 216 could also be used to help detach or resuspend cells. Reagents that could be added include PBS or other buffers, trypsin or other cell detachment solutions, media, fixative, sample (such as cells or media), EDTA, or any other fluid of interest. FIG. 11 shows a reagent delivery system. This is accomplished using either electronic pressure controllers to pressurize the headspace above the liquid reagents to be dispensed into the sample containing vials. Alternatively, a peristaltic, syringe or other pump could be used to drive flow of the reagents to the sample vial or holder. A physical cell detachment method is shown in FIG. 12 which would be located at a different location within the autosampler. Once samples were ready for analysis, the vial or well plate would be shuttled over to the scraper shown in FIG. 12. Either physical scraping achieved by moving the well plate or vial block in 3 dimensions with respect to a fixed soft plastic, rubber, or polymer scraper, thin metal blade, plastic blade attached to the tip can be used to fully remove and suspend the cells.

In an embodiment, provided herein are devices for automated analysis of one or more samples, wherein the process of automated analysis comprises automated flow, wherein the samples comprise liquid or particles in a sample vessel, and wherein the devices comprise an assembly of components that enable processing of a sample (or samples) for analytical assessment by fluidic and/or particle based instruments. The devices may be referred to as autosamplers. Also provided are methods for using such devices.

The automated flow in the devices may comprise systems for moving samples including vacuum systems, pressure-based systems, pneumatic systems, pumps, peristaltic pumps, diaphragms, or syringes. In an embodiment, the automated flow, such as pneumatic flow, may be customized based on analytical parameters including, but not limited to, the nature of the sample being analyzed, the number of samples being analyzed and/or type of fluidic and/or particle based instruments being used for conducting analytical assessment. In an embodiment, the flow rate of samples from source to delivery, i.e. where the delivery may be to a device, instrument, or an optical force-based instrument such as Radiance™, the flow rate may range from 0.01 to 50 □L/min. In alternate embodiments, the flow rates may range from 0.1 to 100 □L/min, 0.5 to 500 □L/min, or 2 to 2000 □L/min. The flow rate of the samples, may be uniquely customized and adjusted for optimal efficiency and consistency and coordinated with reader instruments to facilitate rapid and accurate analytical assessment.

In an embodiment, the samples analyzed by the autosampler device described herein may include, but are not limited to, polymer, metal, glass, or alloy based particles, biological cells, plant cells (algal cells or others), prokaryotic cells (bacteria), eukaryotic cells, yeast, fungus, mold cells, red blood cells, neurons, egg cell (ovum), spermatozoa, white blood cells, basophils, neutrophils, eosinophils, monocytes, lymphocytes, macrophages, platelets, vesicles, exosomes, stromal cells, multicellular constructs such as spheroids, mesenchymal cells, and induced pluripotent stem cells (iPSCs) as well as subcellular components including nuclei, mitochondria, or chloroplasts. The samples may be synthetically manufactured or obtained from natural sources. The samples may be obtained from bodily fluids or bodily matter, including but not limited to, tears, saliva, sputum, blood, plasma, lymph, urine, sweat, pus, nasal discharge or sperm.

In an embodiment the analytical assessment by fluidic and/or particle based instruments includes, but is not limited to, measuring optical force, laser force cytology, automated microscopy, capillary electrophoresis, single cell droplet microfluidics, single cell genomics, sequencing devices, mass spectrometry, and nucleic acid or protein analysis, amplification, or modification.

In an embodiment the assembly of components may comprise, but are not limited to, motors in X, Y, and Z dimensions, limited switches, microfluidic tubing, well plate blocks, electronic pressure controllers controlling the headspace pressure over a fluid in order to achieve flow; pneumatic or fluidic mixing devices with or without temperature control, components for fluid handling, sampling vessels with or without temperature control, mechanical components for translating sampling vessels or other system components. In certain embodiments, the sample (or samples) may be present in single well, single vial, or multi-well plate. The assembly of components, such as the sampling tubes and or well plates may be sterilized. In certain embodiments, the device further comprises a component that penetrates a seal to access the sample headspace and liquid.

In an embodiment, processing of a sample (or samples) comprises activities selected from the group consisting of: selecting a flow rate for the liquid or particles to be delivered to a fluidic and/or particle based instrument, mixing the contents of a sample, incubating the sample, heating the sample, cooling the sample, sterilizing the sample, creating a seal against a vial or well-plate containing a sample, adding reagents such as biochemicals or other biological components such as cells to the sample for a defined period.

In certain embodiments, the components for fluid handling in the device comprise an outer tube that fits within a sample vessel, one or more discrete inner tubes that fit within the diameter of the outer tube, a connection to one or more destination vessels that are fluidically connected to the sampling vessel, one or more separate systems for moving fluid in or out of the sampling vessel in a controlled manner. In some embodiments, a valve may be used to preferentially drive fluid into one or more of the inner tubes or prevent fluid from entering one or more of the inner tubes, and systems for moving fluid may comprise a vacuum system, a pressure-based system, or a pump such as a peristaltic, diaphragm, syringe, or other. In certain embodiments, the fluid handling device sits within a manifold that creates an air tight seal against the sampling vessel or compartment thereof. The outer tube may be constructed of metal, plastic, ceramic, composite, glass/capillary, or other materials; the tube(s) may be constructed of metal, plastic, ceramic, composite, glass/capillary, or other materials. In some embodiments, the inner tube(s) is (are) connected to the outer tube in a reversible manner using a connector such as a fitting, sheath, ferrule, or other housing, or in a permanent manner, through the use of glue, epoxy, cement or other adhesive. In some embodiments, the outer tube and inner are manufactured as a single piece of one or more material types through the use of additive manufacturing techniques including 3D printing, such as stereolithography, digital light processing, fused deposition modeling, selective laser sintering, selective laser melting, electron beam melting, laminated object manufacturing, binder jetting, material jetting, or other techniques. Furthermore, the outer tube and inner may be manufactured from glass using laser patterning and an hydrofluoric acid (HF) or potassium hydroxide (KOH) etching and bonding process. In additional embodiments, the inner tubes of the device are connected to one or more reservoirs of fluids that can be delivered to the sampling vessel or other vessels within the system. The fluids may be delivered to detach adherent cells growing in the sample device. The sample vessels comprise may comprise a vial or a well plate comprising 6, 12, 24, 48, 96, 192, 288, 384, 1536 or any custom number of wells.

In an embodiment, the outer tube is capable of mechanically scraping cells off the bottom surface of the sample vessel (see for example FIG. 12). For example, the outer tube may have a wedge, wafer, tongue, or other shaped attachment made of hard or soft plastic, metal, ceramic and may be capable of mechanically scraping cells off the bottom surface of the sample vessel.

In an embodiment, the inner tube is connected to a reservoir with a maximum pressure sufficiently high to push bubbles out of the system tubing into one or more vessels or fluidic reservoirs.

In an embodiment, the pneumatic pressure utilized by the autosampler of the invention may be adjusted according to the user's needs: for example, in certain embodiments the pressure may be 0-200 psig, 0-150 psig, 1-100 psig, 1-50 psig, or 50 psig. In certain embodiments, the flow through one of more of inner tubes is monitored using a flow meter.

In an embodiment, the device further comprises a mechanism for monitoring flow, such as a flow meter. The flow meter may be used to calculate the amount of fluid removed from or delivered into the sample vessel or any other vessel or container connected to the system.

In an embodiment, the activity of sterilizing the sample, comprises creating a sterile field within a sampling device comprising one or more light sources capable of sterilizing surface through the generation of ultraviolet light. The light source may be an ultra-violet (UV) germicidal lamp, UV-A, UV-B, UV-C, a light-emitting diode (LED), a laser, or other light source of ultraviolet or other broad or narrow wavelengths. In an embodiment, the device further comprises structures or surfaces to contain, direct, or reflect the light to one or more specific areas or surfaces. The light source may be mounted to a static component in the sampling device or the light source may be mounted to a moving component within the sampling device.

In certain embodiments, the seal against a vial or well-plate containing a sample comprises an air tight seal made of rubber, polymer, silicon, Viton™, plastic, or any other suitable material. The outer tube of the fluid handling device may be capable of piercing an air tight seal. The outer tube that makes contact with the seal may be blunt, cut at an angle, or otherwise constructed to allow for easy penetration of the seal. In an embodiment, the seal is constructed in such a way that it remains air tight after being pierced by the outer tube of the fluid handling device.

In an embodiment, a hole or notch may be located above the bottom of the outer tube that sits above the surface of the liquid and below the seal to allow air and pressure changes to pass between the interior and exterior of the outer tube.

In an embodiment, the sample vessel or component thereof has an air tight seal that creates a headspace above the sample fluid and may be continuously incubated under controlled temperature, headspace gas concentration, and sample mixing. The outer tube of the fluid handling device may be capable of piercing the air tight seal and the end of the outer tube that makes contact with the seal may be blunt, cut at an angle, or otherwise constructed to allow for easy penetration of the seal. In an embodiment, a hole or notch may be located above the bottom of the outer tube that sits above the surface of the liquid and below the seal to allow air and pressure changes to pass between the interior and exterior of the outer tube. The seal may be constructed in such a way that it remains air tight after being pierced by the outer tube of the fluid handling device.

In an embodiment, the gas pumped into the head space may be sterile as a result of filtration or other suitable means (FIGS. 7A & B).

In an embodiment, sensors are implemented to measure the temperature, pH, gas concentration, or other parameters of the headspace or sample volume.

In an embodiment, suspension cells may be grown in one or more sample vessels.

In an embodiment, adherent cells may be grown in one or more sample vessels attached to microcarriers, fiber-based membranes, discs, or other structures, or other suitable growth substrate that can be mixed or perfused with medium.

In an embodiment, cells may be mixed by mechanical, magnetic, pneumatic, fluidic or other means.

In an embodiment, the sample vessel may be composed of multiple discrete sub-vessels.

In an embodiment, each sub-vessel has its own headspace, control, and sensor array.

In certain embodiments, the autosampler device of the invention further comprises the feature of delivering one or more reagents to a sample reservoir for mixing and subsequent analysis.

In an embodiment multiple plates are placed or configured in a multiplexed system and accessed by the autosampler device as needed. The plates may be incubated, sterilized etc, as needed. In an embodiment, the device may further be customized to accommodate the loading of multiple distinct plates into the system in a circular, rectangular or other format; the well plates can be loaded into a multi-plate storage device by an automated system, and/or the well plates may be attached to the tower via mechanical, magnetic, electromagnetic, or other means.

The invention claimed is:

1. A device for automated analysis of one or more liquid or particulate samples comprising:
   a) a sample vessel configured to contain the one or more liquid or particulate samples, and
   b) an assembly of components that enable processing of the one or more liquid or particulate samples for analytical assessment by a fluidic or particle-based instrument;
   wherein the assembly of components comprises a fluid handling component that is configured to mix and deliver the one or more liquid or particulate samples and comprises:
   i) an outer tube that fits within the sample vessel, and
   ii) one or more inner tubes disposed within the outer tube, wherein the one or more inner tubes are configured to deliver the sample of the one or more liquid or particulate samples;
   wherein mixing occurs outside of the one or more inner tubes other for sample delivery.

2. The device of claim 1, further comprising a means for generating automated flow of the one or more liquid or particulate samples.

3. The device of claim 2, wherein the means for generating automated flow of the one or more liquid or particulate samples comprises a vacuum system, a pressure-based system, a pneumatic system, a pump, a peristaltic pump, a diaphragm, or a syringe.

4. The device of claim 1, wherein the one or more liquid or particulate samples comprise a polymeric particle, a metal particle, a glass particle, an alloy particle, a cell, a plant cell, an algal cell, a prokaryotic cell, a bacterium, a eukaryotic cell, a yeast cell, a fungus, a mold cell, a red blood cell, a neuron, an egg cell, a spermatozoa, a white blood cell, a basophil, a neutrophil, an eosinophil, a monocyte, a lymphocyte, a macrophage, a platelet, a vesicle, an exosome, a stromal cell, a multicellular construct, a spheroid, a mesenchymal cell, an induced pluripotent stem cell, a subcellular component, a nucleus, a mitochondrion, a chloroplast, or a combination thereof.

5. The device of claim 1, wherein the assembly of components further comprise a motor in an X dimension, a motor in a Y dimension, a motor in a Z dimension, a limited switch, microfluidic tubing, a well plate block, an electronic pressure controller, a temperature controlled pneumatic mixing device, a non-temperature controlled pneumatic mixing device, a temperature controlled fluidic mixing device, a non-temperature controlled fluidic mixing device, a temperature controller for the sample vessel, a mechanical component for translating a component of the assembly of components, a mechanical component for translating the sample vessel, or a combination thereof.

6. The device of claim 1, wherein the sample vessel is a single well, a single vial, or is a well within a multi-well plate.

7. The device of claim 1, wherein the device further comprises a component that penetrates a seal to access the one or more liquid or particulate samples, headspace above the sample, or a combination thereof.

8. The device of claim 1, wherein the fluid handling component is configured to:
   i) withdraw the one or more liquid or particulate samples from the sample vessel,
   ii) dispense the one or more liquid or particulate samples into the sample vessel, or
   iii) a combination thereof.

9. The device of claim 1, wherein the fluid handling component further comprises a valve that is configured to:
   i) drive fluid into the discrete inner tube,
   ii) prevent fluid from entering the discrete inner tube, or
   iii) a combination thereof.

10. The device of claim 1, wherein the one or more inner tubes is reversibly connected to the outer tube by a connector, a fitting, a sheath, a ferrule, a housing, or a combination thereof.

11. The device of claim 1, wherein the one or more inner tubes is irreversibly connected to the outer tube by an adhesive.

12. The device of claim 1, wherein the one or more inner tubes is connected to a fluid reservoir, and wherein the device is configured to deliver a fluid from the fluid reservoir to the sample vessel or to another vessel within the device.

13. The device of claim 12, wherein the fluid is configured to detach adherent cells growing in the device.

14. The device of claim 1, wherein the device further comprises a flow meter.

15. The device of claim 1, wherein the device is configured to select a flow rate for the one or more liquid or particulate samples to be delivered to fluidic or particle-based instrument, mix contents of the one or more liquid or particulate samples, incubate the one or more liquid or particulate samples, heat the one or more liquid or particulate samples, cool the one or more liquid or particulate samples, sterilize the one or more liquid or particulate samples, create a seal against the sample vessel, add a reagent to the one or more liquid or particulate samples, add a cell to the one or more liquid or particulate samples, or a combination thereof.

16. The device of claim 15, wherein the device is configured to create a sterile field with ultraviolet light.

17. The device of claim 1, wherein the device comprises a plurality of sample vessels configured to contain a plurality of samples from among the one or more liquid or particulate samples.

18. A method for automated analysis of a liquid or particulate samples using the device of claim 1, comprising:
   moving the liquid or particulate sample using automated flow, and
   processing the one or more liquid or particulate samples for analytical assessment by the fluidic or particle-based instrument.

19. The method of claim 18, wherein the automated flow is performed with a vacuum system, a pressure-based system, a pneumatic system, a pump, a peristaltic pump, a diaphragm, a syringe, or a combination thereof.

20. The method of claim 18, wherein the processing comprises selecting a flow rate of the one or more the liquid or particulate samples, delivering the one or more liquid or particulate samples to the fluidic or particle-based instrument, mixing contents of the one or more liquid or particulate samples, incubating the one or more liquid or particulate samples, heating the one or more liquid or particulate samples, cooling the one or more liquid or particulate samples, sterilizing the one or more liquid or particulate samples, creating a seal against the sample vessel, adding a reagent to the one or more liquid or particulate samples, adding a cell to the one or more liquid or particulate samples, or a combination thereof.

21. The method of claim 1, wherein the one or more inner tubes comprise a diameter to improve or modify mixing or sample delivery.

\* \* \* \* \*